United States Patent
Ichihashi

(10) Patent No.: US 6,893,585 B2
(45) Date of Patent: May 17, 2005

(54) LIQUID CRYSTAL COMPOSITION, SELECTIVELY REFLECTIVE FILM AND METHOD FOR PRODUCING THE SAME

(75) Inventor: Mitsuyoshi Ichihashi, Shizuoka-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 13 days.

(21) Appl. No.: 10/243,955

(22) Filed: Sep. 16, 2002

(65) Prior Publication Data

US 2003/0122105 A1 Jul. 3, 2003

(30) Foreign Application Priority Data

Sep. 17, 2001 (JP) .................................. 2001-280981

(51) Int. Cl.[7] .............................................. C09K 19/52
(52) U.S. Cl. ................................. 252/299.01; 428/1.1
(58) Field of Search ..................... 428/1.1, 1.3, 1.31; 252/299.01

(56) References Cited

U.S. PATENT DOCUMENTS

| | | | |
|---|---|---|---|
| 5,668,614 A | | 9/1997 | Chien et al. |
| 5,798,057 A | * | 8/1998 | Hikmet ..................... 252/299.5 |
| 5,827,449 A | * | 10/1998 | Hanelt et al. .......... 252/299.62 |
| 5,989,461 A | * | 11/1999 | Coates et al. ............... 252/585 |
| 5,995,184 A | | 11/1999 | Chung et al. |
| 6,099,758 A | * | 8/2000 | Verrall et al. ................ 252/585 |
| 6,117,920 A | * | 9/2000 | Jolliffe et al. ................ 522/170 |
| 6,217,955 B1 | * | 4/2001 | Coates et al. ............... 428/1.31 |
| 6,466,297 B1 | * | 10/2002 | Goulding et al. ........... 349/175 |
| 6,511,719 B2 | * | 1/2003 | Farrand ....................... 428/1.1 |
| 6,616,990 B2 | * | 9/2003 | Prechtl et al. ............... 428/1.1 |
| 6,645,397 B2 | * | 11/2003 | Ichihashi ................ 252/299.61 |
| 6,669,999 B2 | * | 12/2003 | Hsieh et al. .................. 428/1.3 |

FOREIGN PATENT DOCUMENTS

| | | |
|---|---|---|
| JP | 8-245901 | 9/1996 |
| JP | 9-133810 | 5/1997 |
| JP | 10-39812 | 2/1998 |
| JP | 10-054905 | 2/1998 |
| JP | 10-508882 | 9/1998 |
| JP | 10-339867 | 12/1998 |
| JP | 11-142647 | 5/1999 |
| JP | 11-148080 | 6/1999 |
| JP | 11-271529 | 10/1999 |
| JP | 2000-105315 | 4/2000 |
| JP | 2000-226580 | 8/2000 |
| WO | WO 00/33129 | 6/2000 |
| WO | WO 00/34808 | 6/2000 |
| WO | WO 00/34808 A1 | 6/2000 |

\* cited by examiner

Primary Examiner—Mark F. Huff
Assistant Examiner—Jennifer R. Sadula
(74) Attorney, Agent, or Firm—Sughrue Mion, PLLC

(57) ABSTRACT

The present invention provides a liquid crystal composition including a liquid crystal compound containing at least one polymerizable group, two or more kinds of photoreactive chiral compounds that undergo isomerization when respectively irradiated with light beams having mutually different wavelengths and exhibit mutually different HTPs after isomerization, and a polymerization initiator; a selectively reflective film produced using the liquid crystal compound; and a method for producing the selectively reflective film. Instead of the two or more kinds of photoreactive chiral compounds, a single photoreactive chiral compound that undergoes reversible isomerization when irradiated with either of two light beams having mutually different wavelengths may be used.

8 Claims, 4 Drawing Sheets

PEELING

LIQUID CRYSTAL COMPOSITION, SELECTIVELY REFLECTIVE FILM AND METHOD FOR PRODUCING THE SAME

BACKGROUND OF THE INVENTION

1. Field of the Invention

The present invention relates to a liquid crystal composition, a selectively reflective film exhibiting selective reflection of light ranging from the ultraviolet region to the infrared region for use in a color filter and the like, and a method for producing the selectively reflective film.

2. Description of the Related Art

In recent years, attention has been drawn to liquid crystal materials, such as a cholesteric liquid crystal, that have a helical structure and exhibit selective reflection of a variety of colors depending on a twisting power (twist angle) of the helical structure. Since such liquid crystal materials are excellent in selective reflection and color purity of selectively-reflected light, they are widely used in various applications including optical films, liquid crystal color filters, recording media and the like.

Color filters (selectively reflective films) used in, for example, color liquid crystal displays are generally composed of red (R), green (G) and blue (B) pixels and a black matrix arranged therebetween for improving display contrast. Conventional color filters are mainly produced by dispersing pigments in a resin or by dyeing a resin with dyes and their production is ordinarily conducted by spin-coating a colored resin solution on a glass substrate to provide a colored resist layer followed by photo-lithographic patterning the resultant resist layer to form color filter pixels, or by directly printing colored pixels on a substrate.

The printing process described above has a problem in that color filters that are low in pixel resolution and hence unsuitable for forming detailed image patterns are produced. The spin-coating process has drawbacks, which cause large material loss and produce uneven coating when coating is applied to a large-area substrate. If a color filter is produced by an electro-deposition process, the obtained color filter has a relatively high resolution and reduced unevenness in colored layers, but there are drawbacks in that, for example, the production process is complicated and handling of processing liquids is difficult.

In light of the foregoing, there has been a demand for a method for effectively and readily producing a color filter having high quality with reduced material loss.

Color filters are required to have capabilities including high transmittance and high color purity. In recent years, attempts have been made to meet the above-mentioned requirements, for example, by suitably selecting types of dyes and resins to be dyed when dyes are used, or by using finely dispersed pigments when pigments are used. Recently, the level of performance required of color filters with respect to, for example, transmittance and color purity, are increasingly and extremely high when the filters are used in liquid crystal display (LCD) panels. Particularly, it is difficult for the color filters used in reflective LCDs to satisfy all of the requirements of good paper-white display, good contrast and good color reproducibility. Since color filters produced in a conventional manner, such as by dyeing a resin with dyes or dispersing pigments in a resin, are color filters of a light-absorbing type, color purity improvement obtained by increasing transmittance has almost reached its limit.

On the other hand, another type of color filter utilizing polarized light, which is mainly made of a cholesteric liquid crystal, is known. Since this type of color filter utilizing polarized light reflect light having predetermined wavelengths and transmit light of other wavelengths, light-utilizing efficiency is very high, and transmittance and color purity are highly remarkable as compared to color filters of the light-absorbing type. When such color filters utilizing polarized light are produced, spin-coating is typically employed to achieve evenness in layer thickness. However, large material loss is generated through spin-coating, making this production process disadvantageous in terms of cost.

In order to solve the above-described problems, a photoreactive chiral compound is effectively used for producing color filter films capable of exhibiting uniformity in color purity and requiring a reduced number of steps in a production process. When a liquid crystal composition containing a photoreactive chiral compound is patternwise irradiated with light having wavelengths to which the photoreactive chiral compound is photosensitive, the chiral compound causes a reaction, which progresses depending on the intensity of irradiated energy to induce a change in helical pitch (twist angle of the helix) of she liquid crystal compound. Through this process, desired selective color reflection can easily be obtained for each pixel merely by conducting patterning exposure using varied light quantities. This process for producing color filters is advantageous in that patterning exposure may be conducted only once using a photomask having a different light transmittance.

Thus, by conducting imagewise patterning exposure and subsequently fixing the cholesteric liquid crystal compound, a film capable of functioning as a color filter can be formed. This production process may be applied to an optical film, image recording, and the like.

When the liquid crystal composition is exposed to light of wavelengths to which the photoreactive chiral compound is photosensitive, selective reflection of light changes, for example, from B (blue) through G (green) to R (red), depending on the amount of the irradiated light. As shown in FIG. 2, when light of the color G (green) is reflected, a width ($a^2$) of an amount of irradiated light is small, whereby the green light becomes bluish or yellowish if irregular exposure occurs at the time of irradiating light. Accordingly, it has been difficult to produce color filters exhibiting color uniformity.

SUMMARY OF THE INVENTION

In view of the above-described problems of the prior art, it is an object of the present invention to provide a selectively reflective film excellent in color uniformity, a liquid crystal composition from which the selectively reflective film can be produced, and a method for readily producing the selectively reflective film.

A first aspect of the invention is a liquid crystal composition comprising: a liquid crystal compound containing at least one polymerizable group; two or more kinds of photoreactive chiral compounds that undergo isomerization when respectively irradiated with light beams having mutually different wavelengths and exhibit mutually different HTPs (twisting power) after isomerization; and a polymerization initiator.

A second aspect of the invention is a liquid crystal composition comprising: a liquid crystal compound containing at least one polymerizable group; a photoreactive chiral compound that undergoes reversible isomerization when irradiated with either of two light beams having mutually different wavelengths and exhibits an HTP after isomerization by each light beam, which HTPs are mutually different; and a polymerization initiator.

A third aspect of the invention is a selectively reflective film produced by polymerizing and hardening a liquid crystal composition comprising a liquid crystal compound containing at least one polymerizable group; two or more kinds of photoreactive chiral compounds that undergo isomerization when respectively irradiated with light beams having mutually different wavelengths and exhibit mutually different HTPs after isomerization; and a polymerization initiator.

A fourth aspect of the invention is a selectively reflective film produced by polymerizing and hardening a liquid crystal composition comprising a liquid crystal compound containing at least one polymerizable group; a photoreactive chiral compound that undergoes reversible isomerization when irradiated with either of two light beams having mutually different wavelengths and exhibits an HTP after isomerization by each light beam, which HTPs are mutually different; and a polymerization initiator.

A fifth aspect of the invention is a method for producing a selectively reflective film using a liquid crystal composition comprising a liquid crystal compound containing at least one polymerizable group; two or more kinds of photoreactive chiral compounds that undergo isomerization when respectively irradiated with light beams having mutually different wavelengths and exhibit mutually different HTPs after isomerization; and a polymerization initiator, the method comprising the steps of: preparing the liquid crystal composition, which is capable of displaying selective reflection of a first color; coating the liquid crystal composition on a surface of a substrate; imagewise irradiating light having a first wavelength to which one of the photoreactive chiral compounds is photosensitive to undergo isomerization, such that selective reflection of a second color is displayed; imagewise irradiating light having a second wavelength, which is different from the first wavelength and to which another of the photoreactive chiral compounds is photosensitive to undergo isomerization, such that selective reflection of a third color is displayed; and polymerizing the liquid crystal compound.

A sixth aspect of the invention is a method for producing a selectively reflective film using a liquid crystal composition comprising a liquid crystal compound containing at least one polymerizable group; a photoreactive chiral compound that undergoes reversible isomerization when irradiated with either of two light beams having mutually different wavelengths and exhibits an HTP after isomerization by each light beam, which HTPs are mutually different; and a polymerization initiator, the method comprising the steps of: preparing the liquid crystal composition, which is capable of displaying selective reflection of a first color; coating the liquid crystal composition on a surface of a substrate; imagewise irradiating light having a first wavelength to which the photoreactive chiral compound is photosensitive to undergo isomerization, such that selective reflection of a second color is displayed; imagewise irradiating light having a second wavelength, which is different from the first wavelength and to which the photoreactive chiral compound is photosensitive to undergo isomerization, such that selective reflection of a third color is displayed; and polymerizing the liquid crystal compound.

DESCRIPTION OF THE PREFERRED EMBODIMENTS

Figure 1A:
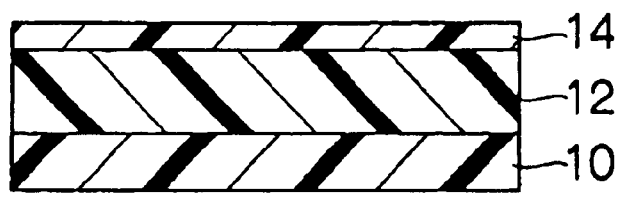
FIGS. 1A to 1I are schematic drawings showing a part of a process for producing a liquid crystal color filter of the present invention.
Figure 1B:
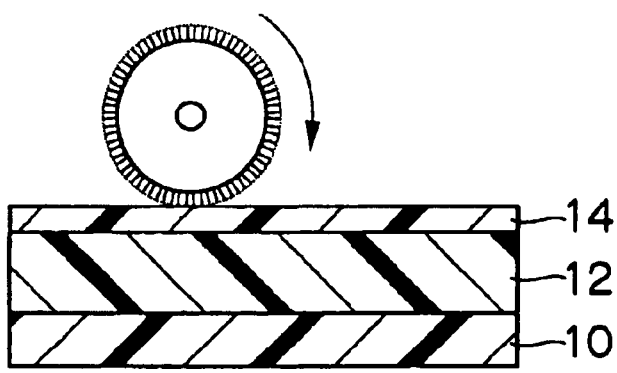

Hereinafter, a liquid crystal composition, a selectively reflective film and a method for producing the selectively reflective film according to the present invention are described.

<Liquid Crystal Composition>

The liquid crystal composition according to the first aspect of the invention comprises a liquid crystal compound containing at least one polymerizable group, two or more kinds of photoreactive chiral compounds that undergo isomerization when respectively irradiated with light beams having mutually different wavelengths and exhibit mutually different HTPs after isomerization and a polymerization initiator, as well as additional components as necessary. Each of the components are described hereinafter.

(Liquid Crystal compound)

The liquid crystal compounds may be appropriately selected from low molecular weight liquid crystal compounds, high molecular weight liquid crystal compounds and polymerizable liquid crystal compounds having anisotropy of a refractive index Δn of 0.05 to 0.40. Among them, a nematic liquid crystal compound is particularly preferable. These liquid crystal compounds may be aligned by using, for example, an aligned substrate which has undergone aligning treatment such as rubbing while the liquid crystal compound is in a molten and liquid crystal state. If the liquid crystal state is fixed by transforming the state into a solid phase, cooling, polymerization or the like may be carried out.

Specific examples of the liquid crystal compound include the following compounds. In the present invention, however, the liquid crystal compounds are not limited thereto.

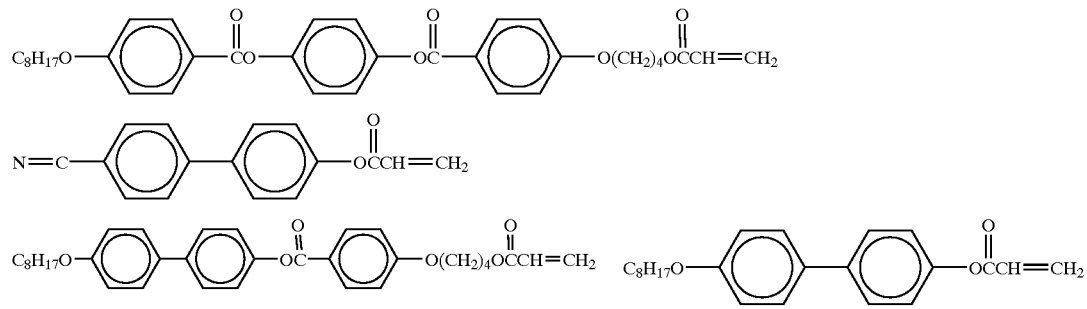

-continued
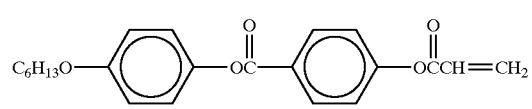
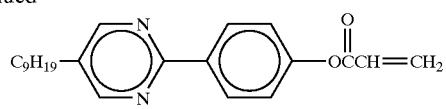
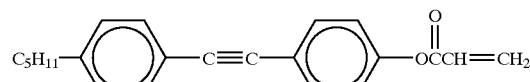
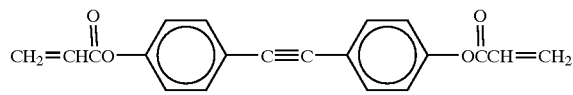
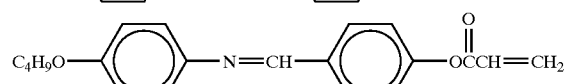
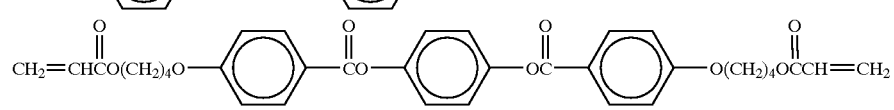
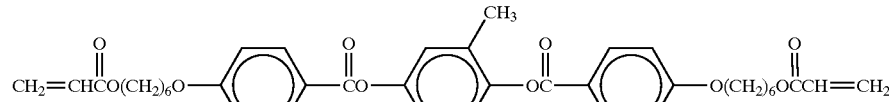
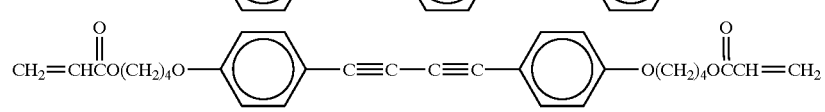
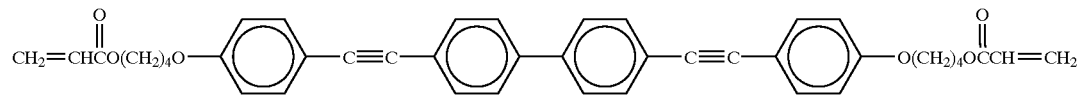
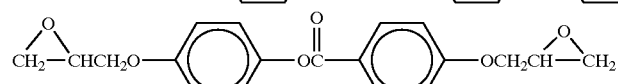
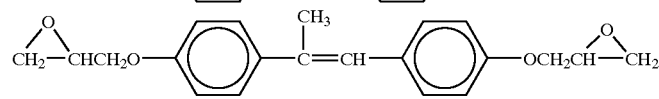
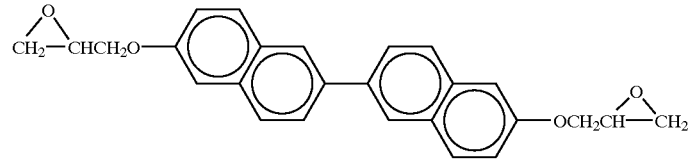
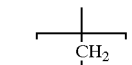
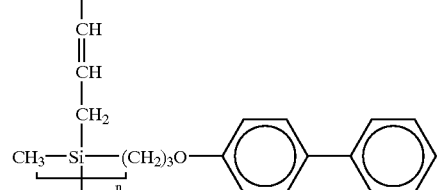
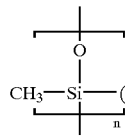
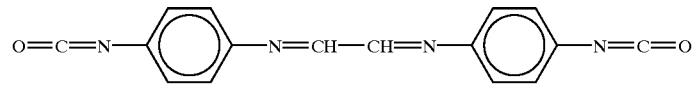
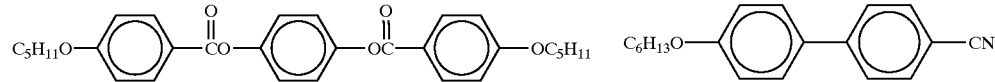

In the formulae shown above, n represents an integer of 1 to 1,000.

Also usable as preferable examples are compounds similar to the compounds exemplified above, in which linking groups of aromatic rings are replaced by any group having the following structure.

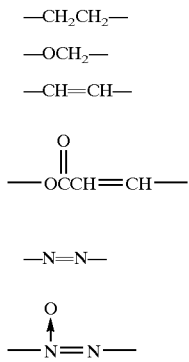

Among the compounds listed above, liquid crystal compounds carrying in the molecule at least one polymerizable or crosslinking group are preferable from the viewpoints of securing sufficient curability and heat resistance of the layer.

The content of the liquid crystal compound is preferably 30 to 99.9% by mass, and more preferably 50 to 95% by mass relative to the total solid content of the liquid crystal composition. If the content is less than 30% by mass, alignment may be insufficient to fail to achieve selective reflection of desired colors.

(Photoreactive Chiral Compound)

In the invention, two or more kinds of photoreactive chiral compounds are used which undergo isomerization when respectively irradiated with light beams having mutually different wavelengths and exhibit mutually different HTPs. For example, a photoreactive chiral compound which is photosensitive to a shorter wavelength of about 313 nm and another photoreactive chiral compound which is photosensitive to a longer wavelength of above 365 nm are simultaneously used. Since the respective photoreactive chiral compounds exhibit different HTPs after isomerization, if the liquid crystal composition has been prepared beforehand to display selective reflection of G (green) light, and light of a shorter wavelength and light of a longer wavelength are successively irradiated, then the liquid crystal composition displays selective reflection of R (red) light and B (blue) light, respectively. In this case, the two kinds of photoreactive chiral compounds having mutually opposite senses are used. If necessary, a non-photoreactive chiral compound (described later) may be included in the composition.

In order to prepare a liquid crystal composition capable of displaying selective reflection of a specified color, calculation is conducted from the values of HTP each obtained with one photoreactive chiral compound which is photosensitive to a shorter wavelength and the other photoreactive chiral compound which is photosensitive to a longer wavelength, both before and after UV irradiation (after isomerization). For example, suppose that a liquid crystal composition developing B color (reflecting light of a wavelength of 450 nm) is irradiated with light having a wavelength of 365 nm to reflect light of the color G (reflecting light of a wavelength of 530 nm), and further irradiated with light having a wavelength of 313 nm to reflect light of the color R (reflecting light of a wavelength of 640 nm). Incidentally, both of the photoreactive chiral compounds have the same rotational sense. Further, suppose that the one photoreactive chiral compound to undergo isomerization when irradiated with light having a wavelength of 365 nm has HTPs, before and after isomerization, of 40 and 20, respectively; while the other photoreactive chiral compound to undergo isomerization when irradiated with light having a wavelength of 313 nm has HTPs, before and after isomerization, of 30 and 10, respectively. Then, helical pitches to reflect each of BGR colors are calculated and from the obtained values, a change in a reciprocal number of the helical pitches ($\mu$m) of the composition is calculated at the time when reflected light is changed from B to G and from B to R, respectively. In this case, if an average refractive index is 1.5, changes in a reciprocal number at the time of changing the light of colors from B to G and from B to G are about 0.5 and 1.5, respectively. Thus, the amount of the one chiral compound necessary to undergo isomerization when irradiated with light having a wavelength of 365 nm is calculated to be 2.5% by mass (=0.5×100/(40−20)), and the amount of the other chiral compound necessary to undergo isomerization when irradiated with light having a wavelength of 313 nm is calculated to be 5.0% by mass (=1.0×100/(30−10)). Since in this case the selectively reflected wavelength of B color becomes too long, a non-photoreactive chiral compound having the same sense is added to the composition for adjustment. If the non-photoreactive chiral compound has an HTP of 20, it is enough to add the non-photoreactive chiral compound at about 4% by mass. Incidentally, calculated values only serve as a rough estimate so that some adjustment may be needed when applying the values practically.

The followings are specific examples of photoreactive chiral compounds that are photosensitive to a shorter wavelength of about 313 nm, however, these examples are not intended to limit the invention. To the right of each compound there is shown a sense of twist, an HTP, a peak absorption wavelength and a solvent used for measuring wavelengths thereof. The wavelength at which the photoreactive chiral compound isomerizes is almost equal to the peak absorption wavelength.

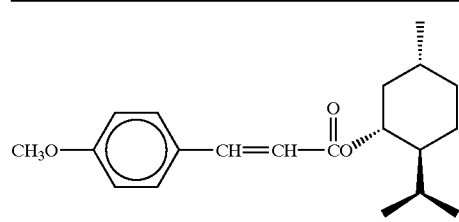

Counter clockwise (CCW) twist, HTP (27)
302 nm, EtOAc

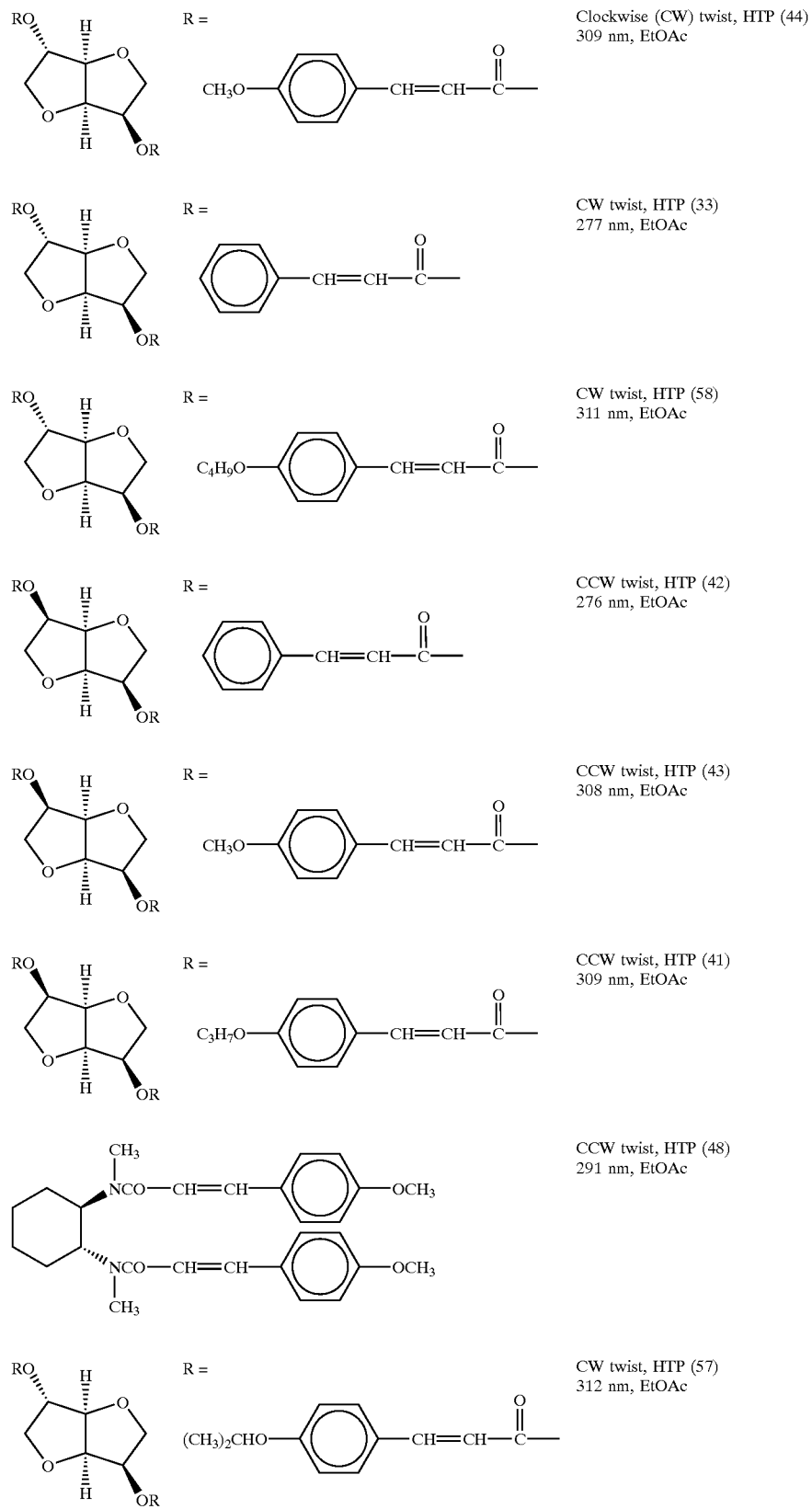

-continued
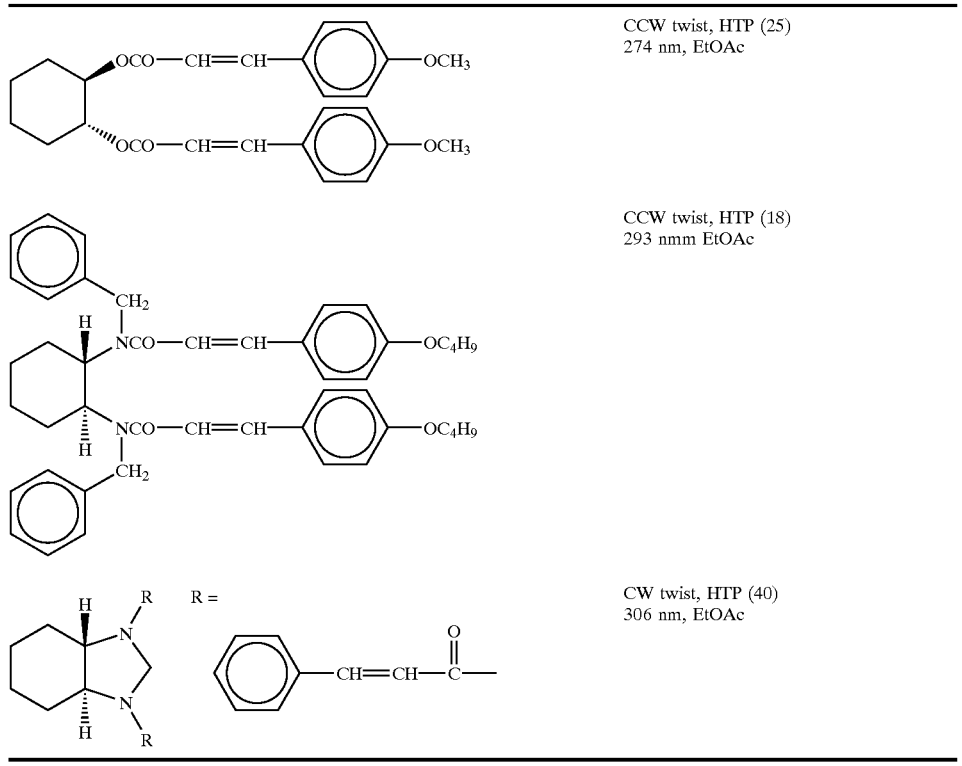
CCW twist, HTP (25)
274 nm, EtOAc
CCW twist, HTP (18)
293 nmm EtOAc
CW twist, HTP (40)
306 nm, EtOAc
The followings are specific examples of photoreactive chiral compounds that are photosensitive to a longer wavelength of about 365 nm.
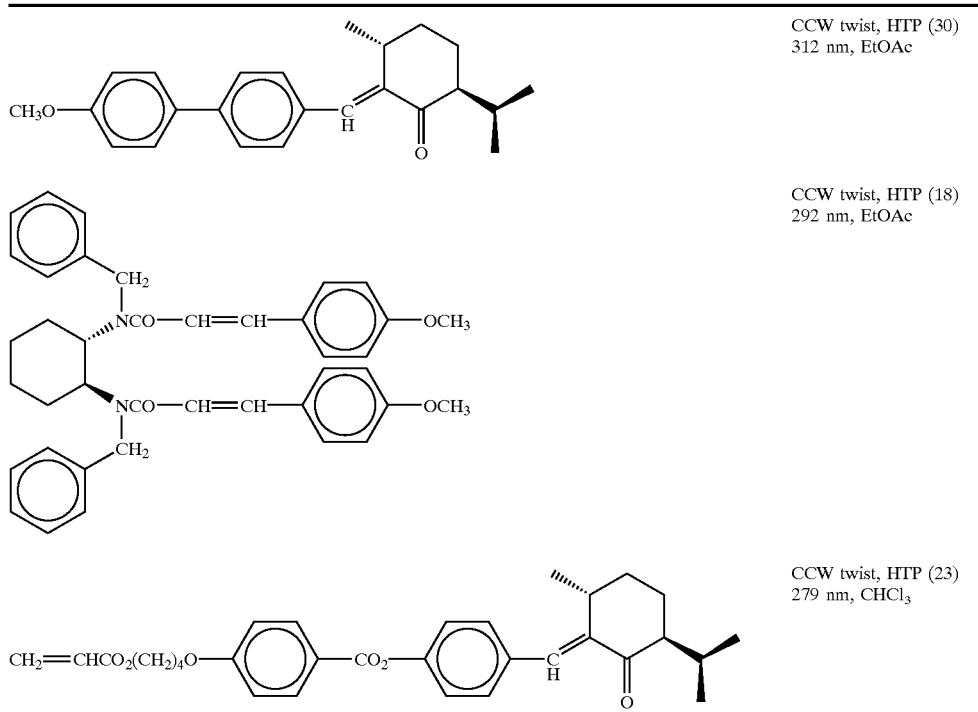
CCW twist, HTP (30)
312 nm, EtOAc
CCW twist, HTP (18)
292 nm, EtOAc
CCW twist, HTP (23)
279 nm, CHCl$_3$

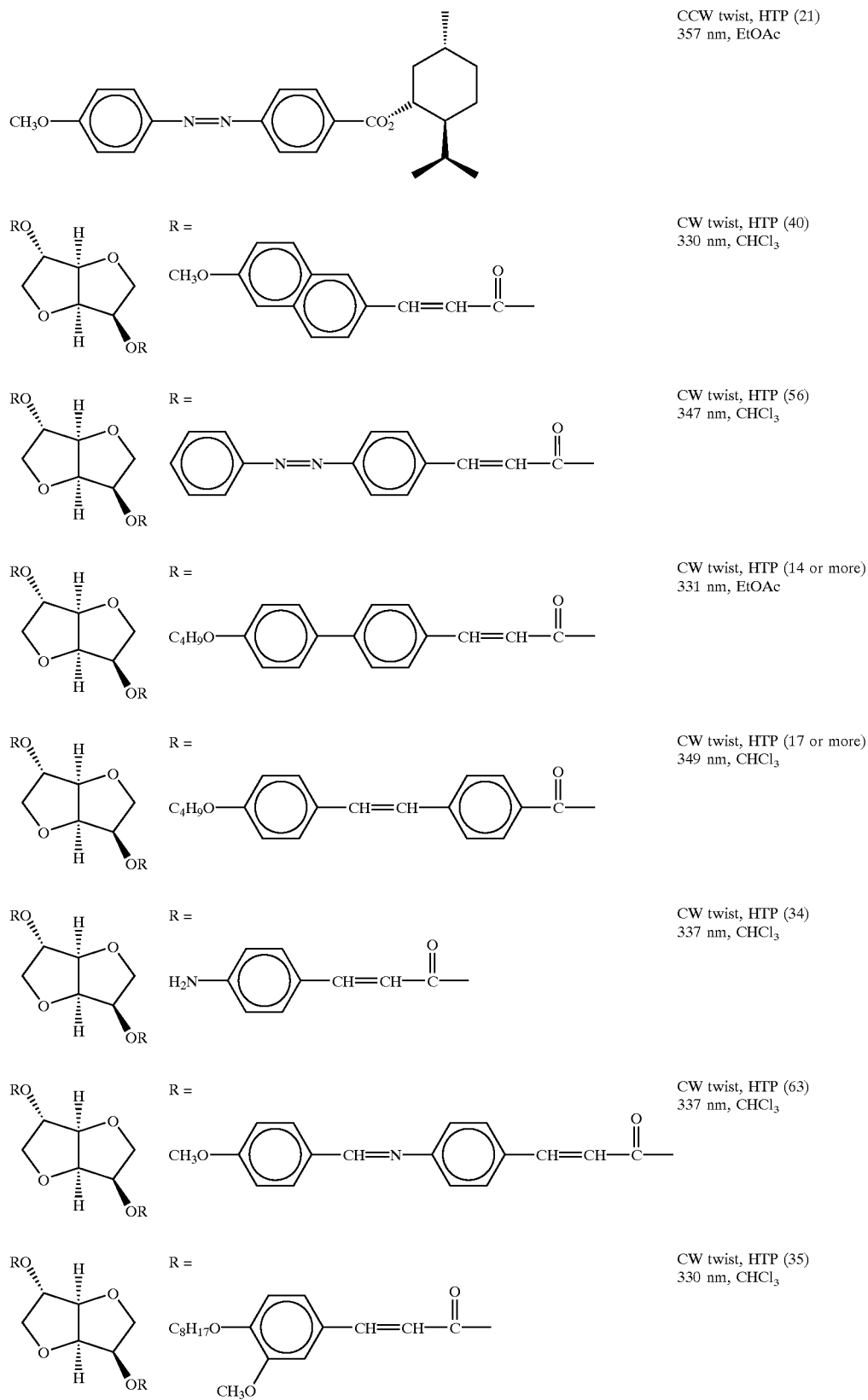

-continued

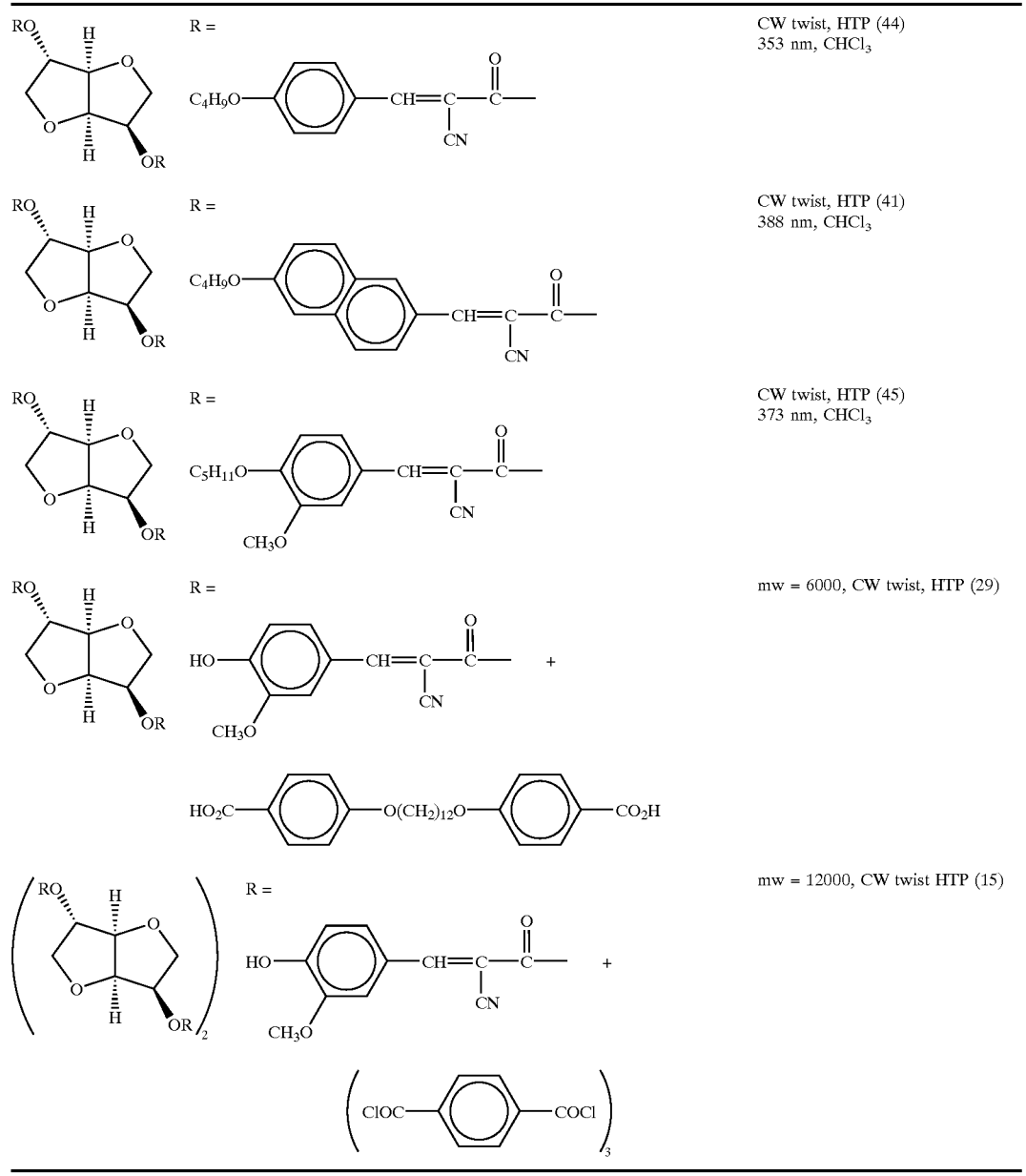

(Non-photoreactive Chiral Compound)

In the invention, it is preferable to include a non-photoreactive chiral compound, together with the above-described photoreactive chiral compounds, to make the liquid crystal composition display selective reflection of a desired color. From the viewpoints of improving color hues and color purity of the liquid crystal compound, preferable examples of the non-photoreactive chiral compound include isomannide, catechin, isosorbide, fenchone and carvone. Additional examples include chiral compounds described, for example, in Japanese Patent Application Laid-Open (JP-A) No. 2000-44451, Japanese National Publication No. 10-509726, WO 98/00428, Japanese National Publication Nos. 2000-506873 and 9-506088, *Liquid Crystals* 1996, 21, 327 and *Liquid Crystals* 1998, 24, 219.

The content of the chiral compound is preferably 5 to 30% by mass relative to the total solid content of the liquid crystal composition.

(Polymerization Initiator)

If a polymerization reaction is utilized for the liquid crystal compound having a polymerizable group to fix the helical structure after the twisting power has been changed by irradiating the liquid crystal with light, a polymerization initiator is added to the composition. The polymerization initiator can suitably be selected from conventionally known compounds that are photoreactive and thermoreactive. Among others, photo-polymerization initiators capable of accelerating a reaction by light irradiation are particularly preferable. In order to fix the helical structure after the desired helical structure has been formed, the polymerization reaction of the liquid crystal composition is preferably allowed to proceed rapidly.

Examples of the photo-polymerization initiator suitably selected from conventionally known initiators include p-methoxyphenyl-2,4-bis(trichloromethyl)-s-triazine, 2-(p- butoxystyryl)-5-trichloromethyl-1,3,4-oxadiazole, 9-phenylacridine, 9,10-dimethylbenzphenazine, benzophenon/Michler's ketone, hexaarylbiimidazole/mercaptobenzimidazole, benzyldimethylketal, thioxanthone/amine, triarylsulfonium hexafluorophosphate, bisacylphosphine oxides such as bis-(2,4,6-trimethylbenzoyl)phenylphosphine oxide described in JP-A No. 10-29997 and acylphosphine oxides such as those described in DE4230555 by Lucirin TPO.

The polymerization initiators having a different spectrally sensitive range from that of the photoreactive chiral compounds (described later) are preferably chosen. Here, "having a different spectrally sensitive range" refers to that their central photosensitive wavelengths do not overlap each other, and alignment of the liquid crystal is not altered at the time of imagewise exposure and polymerization for hardening, to an extent that image displaying property and color purity may not be impaired. In order to avoid overlapping of the central photosensitive wavelengths, a band pass filter or the like is used to control the wavelength of light irradiated, in addition to suitably selecting the molecular structures of the both compounds.

The content of the polymerization initiator is preferably 0.1 to 20% by mass, and more preferably 0.5 to 5% by mass relative to the total solid content of the liquid crystal composition. If the content is less than 0.1% by mass, curability at the time of irradiating light may be lowered, occasionally requiring a prolonged time for hardening. If the content exceeds 20% by mass, light transmittance in the ultraviolet-visible region may be decreased.

(Polymerizable Monomer)

The liquid crystal composition of the invention may further include a polymerizable monomer. If the polymerizable monomer is included in the liquid crystal composition, the monomer serves to fix the helical structure (to display selective reflection) of the liquid crystal after the twisting power of the liquid crystal has been changed by light irradiation and a distribution of selectively reflected wavelengths has been established (patterning), whereby the strength of the fixed liquid crystal composition can be further increased. However, the polymerizable monomer needs not always be included if the nematic liquid crystal compound has an unsaturated bond within a molecule.

As the polymerizable monomer, a monomer having an ethylenically unsaturated bond may be exemplified. Specific examples thereof include polyfunctional monomers such as pentaerythritol tetracrylate and dipentaerythritol hexacrylate.

Specific examples of the monomer having an ethylenically unsaturated bond are shown below. However, these examples are not limiting the present invention.

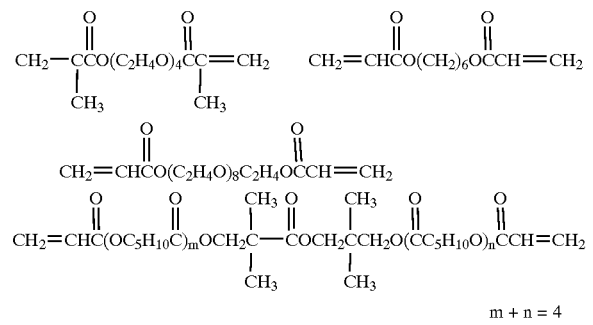

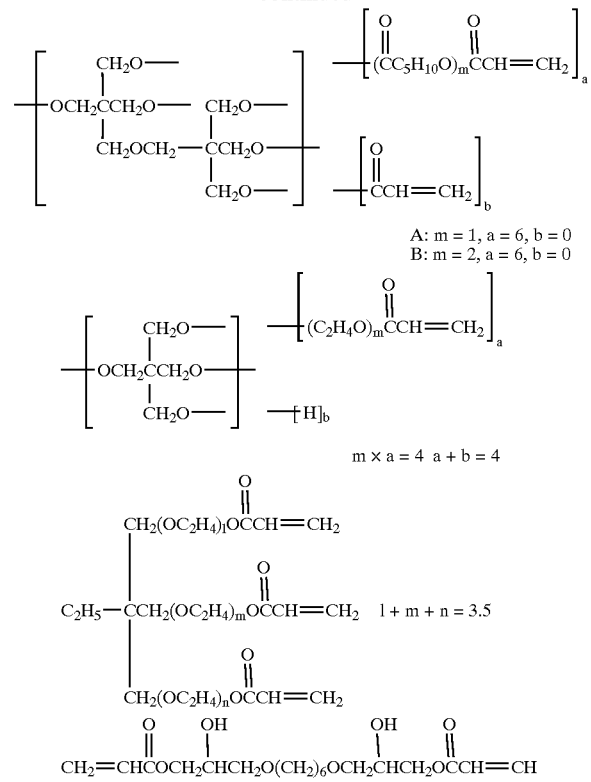

The content of the polymerizable monomer is preferably 0.5 to 50% by mass relative to the total solid content of the liquid crystal composition. If the content is less than 0.5% by mass, sufficient curability may not be obtained. If the content exceeds 50% by mass, the polymerizable monomer may interfere alignment of the liquid crystal molecules, occasionally leading to insufficient color development.

(Air Interface Alignment Agent)

In the invention, it is preferable to include in the liquid crystal composition a surfactant which exerts an excluded volume effect distributed over an air interface side (hereinafter referred to as an "air interface alignment agent"). If an air interface alignment agent is included, the agent serves to three-dimensionally control an alignment state at a surface of the layer interfacing with air, when a liquid crystal composition is applied in a state of a coating solution. Particularly when the agent is applied in a cholesteric liquid crystal phase, light of selectively reflected wavelength having higher color purity can be obtained.

An air interface alignment agent is a surfactant exerting an excluded volume effect. As used herein, exerting an excluded volume effect means control of aligning liquid crystal (molecules) at the air interface side, that is, three-dimensional control of a spatial alignment state of a liquid crystal at a layer surface interfacing with air when a layer including a liquid crystal composition is formed by application of coating. In more detail, this term means control of pre-tilt angles of liquid crystal molecules at the air interface side.

The requirements for a preferable molecular structure of an air interface alignment agent are to have a flexible hydrophobic moiety and a moiety having at least one ring unit and a structural stiffness (hereinafter referred to as a stiff moiety). The flexible hydrophobic moiety can be either a perfluoro chain or a long alkyl chain depending on the kind of a liquid crystal compound used. Since a hydrophobic moiety is flexible, the hydrophobic moiety can effectively be located on the air side.

An air interface alignment agent may be of a short molecular chain having a molecular weight of the order of several hundreds or of the polymer or the oligomer consisting of the short molecular chain. Furthermore, there may be included a polymerizable functional group in the molecule of the agent depending on the use purposes.

When such an air interface alignment agent is used, a flexible hydrophobic moiety of an air interface alignment agent is arranged to the air interface; and at the same time, a stiff moiety is arranged to a liquid crystal molecule orientation, shaped to be flat and positioned in parallel to the air interface, to thereby permit alignment of liquid crystal molecules parallel to the air interface.

On the other hand, if a stiff moiety is oriented in a direction perpendicular to the air interface, liquid crystal molecules can be aligned in a direction perpendicular to the air interface.

Specifically, a nonionic surfactant is preferably used and the following compounds may be exemplified.

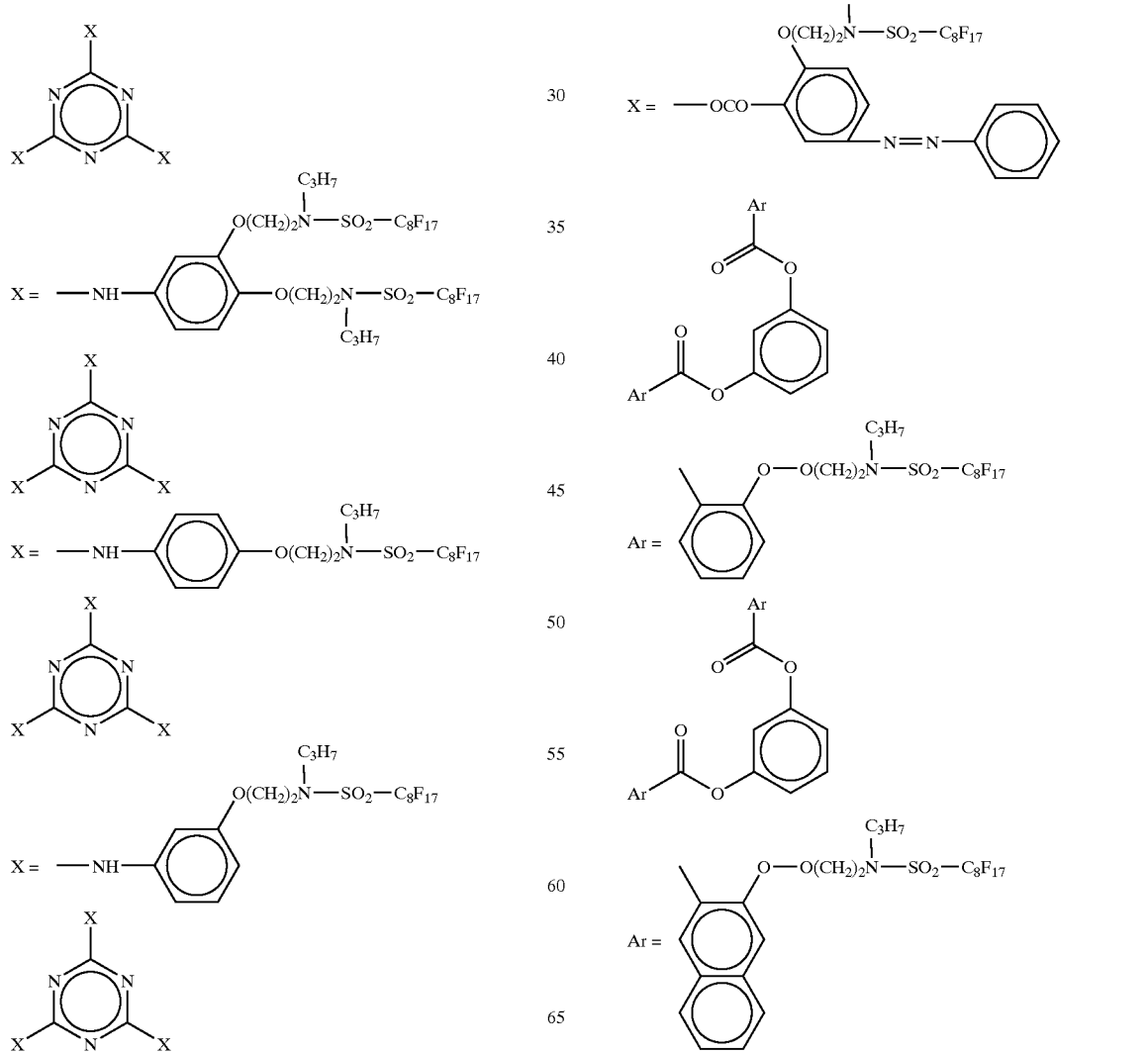

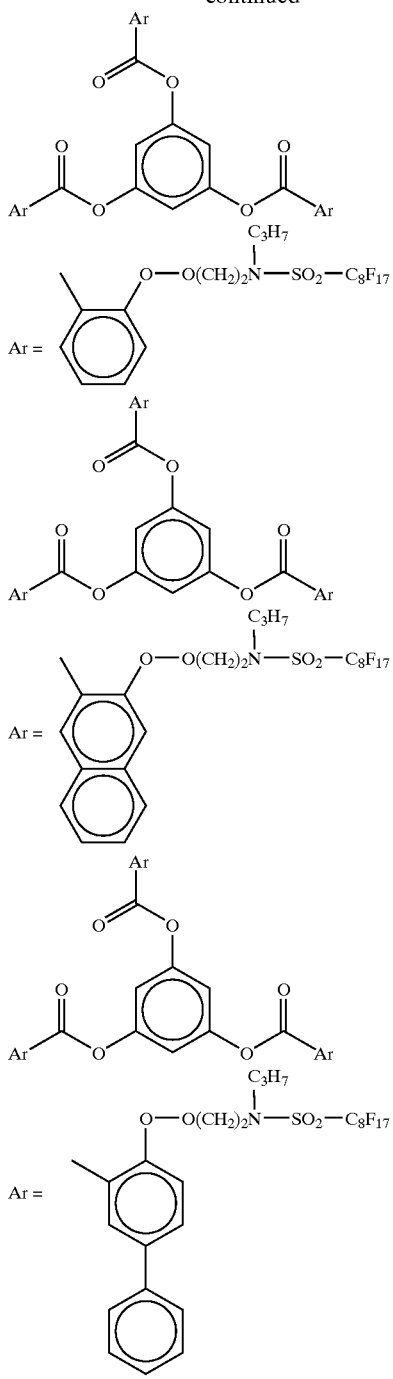

The addition amount of an air interface alignment agent is preferably a quantity to cover a surface of the air interface side of a layer including a liquid crystal composition by one molecule, and preferably of from 0.05 to 5 mass % and more preferably of from 0.1 to 1.0 mass % relative to the total solid content of the liquid crystal composition. When the addition amount is less than 0.05 mass %, the effects of the agent are not always exerted, while when the addition amount is in excess of 5 mass %, an air interface alignment agent itself occasionally causes an association, resulting in phase separation from liquid crystal.

If an air interface alignment agent is used, a surface tension can be decreased. Other kinds of surfactants than the air interface alignment agent can be used together with this agent for the purpose of further reducing a surface tension and improving coatability.

(Additional Components)

As additional components, the following may be included in the composition: a binder resin, a solvent, a surfactant, a polymerization inhibitor, a thickening agent, a dye, a pigment, an ultraviolet absorbent, a gelling agent and so on.

Examples of the binder resin include polystyrene compounds such as polystyrene and poly-α-methylstyrene; cellulose resins such as methylcellulose, ethylcellulose and acetylcellulose; acidic cellulose derivatives having, as its side chain, a carboxylic group; acetal resins such as polyvinyl formal and polyvinyl butyral; and methacrylic acid copolymer, acrylic acid copolymer, itaconic acid copolymer, crotonic acid copolymer, maleic acid copolymer and partially-esterified maleic acid copolymer described in JP-A Nos. 59-44615, Japanese Patent Application Publication (JP-B) Nos. 54-34327, 58-12577 and 54-25957, JP-A Nos. 59-53836 and 59-71048.

As other examples of the binder resin, there may be exemplified a homopolymer of an acrylic acid alkyl ester and a homopolymer of methacrylic acid alkyl ester in which an alkyl group may preferably be a methyl, ethyl, n-propyl, n-butyl, iso-butyl, n-hexyl, cyclohexyl, 2-ethylhexyl or the like group.

Besides, the binder resin may be a polymer having a hydroxyl group to which is added an acid anhydride, benzyl (meth)acrylate/(methacrylic acid homopolymer)acrylic acid copolymer, a multiple copolymer of benzyl(meth)acrylate/(meth)acrylic acid/another monomer, or the like.

The addition amount of the binder resin in the liquid crystal composition is preferably from 0 to 50% by mass, and more preferably from 0 to 30% by mass. If the amount is more than 50% by mass, alignment of the cholesteric liquid crystal compound may sometimes become insufficient.

In the liquid crystal composition of the invention, it is particularly preferable to use a surfactant, in combination with the photoreactive chiral agent and the liquid crystal compound, preferably a nematic liquid crystal compound. As the surfactant, a surfactant exerting an excluded volume effect is preferably used. Here, "exerting an excluded volume effect" means that the surfactant serves to three-dimensionally control a spatial alignment state at the surface of the layer interfacing with air. Specifically, a nonionic surfactant is preferable and suitably selected for use from the conventionally known nonionic surfactants.

The polymerization inhibitor may be added to the composition to improve storability. Examples of the polymerization inhibitor include hydroquinone, hydroquinone monomethyl ether, phenothiazine, benzoquinone, and the derivatives thereof. The addition amount of the polymerization inhibitor is preferably from 0 to 10% by mass, more preferably from 0 to 5% by mass, relative to the content of the polymerizable monomer.

The liquid crystal composition may be prepared by dissolving or dispersing the aforementioned respective components in a suitable solvent and formed into an arbitrary shape, or disposed onto a support or the like for use. Examples of the solvent include 2-butanone, cyclohexanone, methylene chloride and chloroform.

Next, the liquid crystal composition according to the second aspect of the invention is described. The liquid crystal composition according to the second aspect is the same as that according to the first aspect, except that the composition comprises a single kind of photoreactive chiral compound.

The photoreactive chiral compound in the composition according to the second aspect is a compound that undergoes reversible isomerization when irradiated with either of two light beams having mutually different wavelengths and exhibits an HTP after isomerization by each light beam, which HTPs are mutually different. For example, the photoreactive chiral compound shown below isomerizes to a compound having an HTP of 136 when irradiated with light having a wavelength of 366 nm, which latter compound reversibly isomerizes to the former compound having an HTP of 28 when irradiated with light of 495 nm.

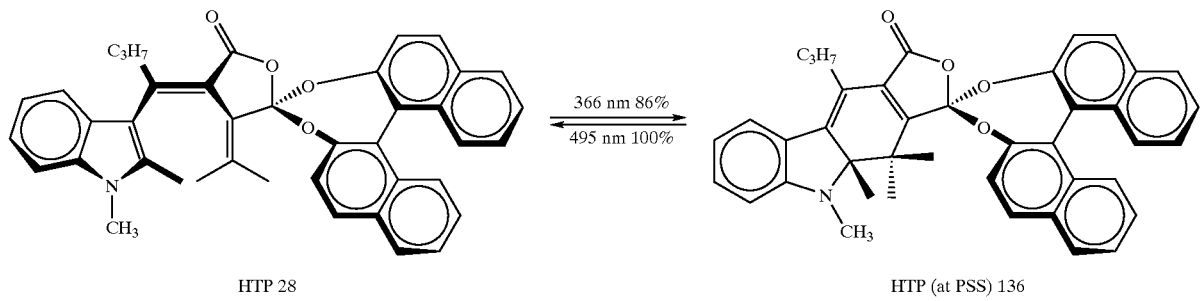

20

The followings are specific examples of the photoreactive chiral compound used in the second aspect, however, these examples are not intended to limit the invention.

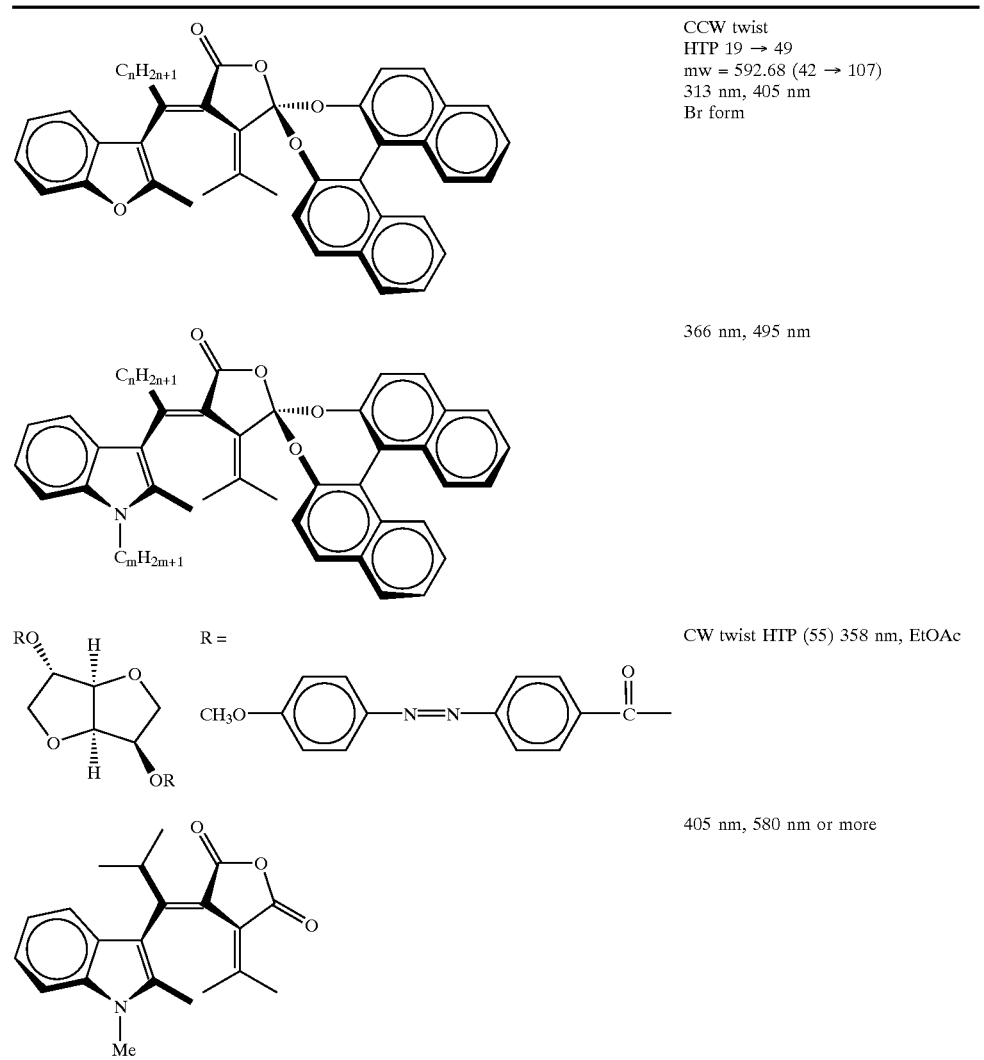

-continued

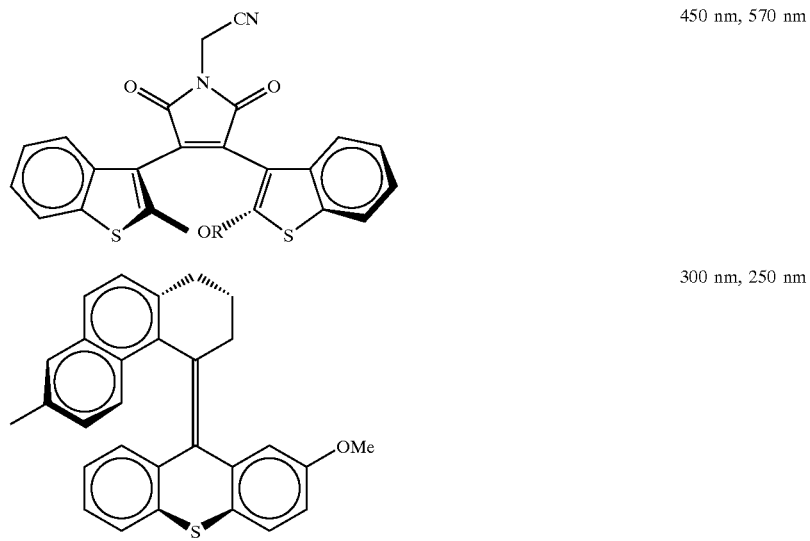

450 nm, 570 nm 300 nm, 250 nm

<Change in Helical Structure of Liquid Crystal>

As described above, the liquid crystal composition of the invention comprises the photoreactive chiral compound, and when the composition is patternwise irradiated with light beams each having different wavelengths, the twisting power of the liquid crystal is altered to form the regions in which respective helical structures have different twisting degrees (twisting power; HTP).

Particularly in case where the liquid crystal phase is a cholesteric liquid crystal phase, selective color reflection can arbitrarily be obtained by changing the twisting power of the liquid crystal. If a changing ratio of the twisting power (changing ratio of a twist) is large, a range of selective color reflection displayed by the liquid crystal is wide, whereby a broad range of selectively reflected wavelengths including three primary colors (B, G, R) can be obtained.

Specifically, selective color reflection can be achieved in the following manner.

When the liquid crystal composition of the invention is irradiated with light having wavelengths to which the photoreactive chiral compound included therein is photosensitive, the compound responds to the wavelength of the irradiated light and isomerizes to induce a change in the helical structure (twist angle) of the liquid crystal, and this structural change allows selective reflection of different colors to thereby form an imagewise pattern (patterning). Thus, by irradiating light beams of varied wavelengths for respective desired regions, a plurality of colors can be reflected depending on the used wavelengths. And by irradiating light through an imagewise formed photomask having different transmissive areas, colored regions selectively reflecting different colors can be formed.

When a liquid crystal color filter, an optical film (described later) or the like is produced, patterning exposure is conducted as described above by imagewise irradiating light having wavelengths to which the photoreactive chiral compound is photosensitive, followed by additional irradiation to cause photo-polymerization of the polymerizable groups for curing the liquid crystal composition to thereby fix the helical structure of the liquid crystal, such that selective reflection of desired colors can be displayed. This process will be described in detail later.

As the light source for use in the irradiation, the light sources which emit UV light are preferably used from the viewpoints of having high energy and of causing rapid structure change and a swift polymerization reaction of the liquid crystal compound. Preferable examples of the light source include a high-pressure mercury lamp, a metal halide lamp and an Hg—Xe lamp. The light source preferably has a function of varying light quantities.

<Fixing of Helical Structure of Liquid Crystal>

As described above, by irradiating the photoreactive chiral compound with light having specified wavelengths, the twisting power of the co-existing liquid crystal may be altered to cause a change in the helical structure. The liquid crystal composition of the invention comprises a liquid crystal compound having polymerizable groups, a photopolymerization initiator and at least one photoreactive chiral compound. By effecting polymerization or cross-linking of the liquid crystal compound, the altered helical structure can be fixed, and further strength of the fixed liquid crystal composition can be enhanced.

It is preferable to use the photo-polymerization initiator and the photoreactive chiral compound whose spectral sensitive range is different with each other.

Specifically, selective color reflection can be achieved in the following manner.

First, similarly to the patterning exposure described in the section of "Change in Helical Structure of Liquid Crystal" above, the liquid crystal composition of the invention is irradiated with light having wavelengths to which the photoreactive compound included therein is photosensitive. By this irradiation, the co-existing photoreactive compound responds to the wavelength of irradiated light and isomerizes to induce a change in the helical structure, leading to formation of an imagewise pattern (patterning). After this patterning, another irradiation is conducted using another light beam having wavelengths to which the photopolymerization initiator is photosensitive. By this irradiation, the photo-polymerization initiator responds to the wavelength and causes polymerization of the liquid crystal compound, thereby fixing the composition and maintaining the altered helical structure. Prior to this step, an additional step of, e.g., nitrogen replacement, may be performed.

In case where the spectrally sensitive range of the photoreactive chiral agent does not overlap with that of the photo-polymerization initiator, irradiation for changing the HTP and irradiation for photo-polymerization do not affect each other. Thus, when imagewise exposure is conducted to induce a change in HTPs, photo-polymerization of the liquid crystal composition does not progress, whereby patterning can be achieved with an intended HTP changing ratio. Further, when the photo-polymerization is conducted to fix the helical structure, the photoreactive compound does not respond to light irradiation, whereby the changed HTP pattern thus formed can securely be fixed.

When a liquid crystal color filter, an optical film (described later) or the like is produced, patterning exposure is conducted as described above by imagewise irradiating light having wavelengths to which the photoreactive compound is photosensitive, followed by additional irradiation to cause photo-polymerization of the polymerizable group for curing the liquid crystal composition to thereby fix the helical structure of the liquid crystal, such that selective reflection of desired colors can be displayed. This process will be described in detail later.

The light source for use in the irradiation is the same as those exemplified in the section of "Change in Helical Structure of Liquid Crystal" above.

Although the above-described process utilizes polymerization for fixing the liquid crystal composition, fixing may be effected by, for example, cross-linking through vulcanization or causing glass phase transition.

<Selectively Reflective Film>

A selectively reflective film of the invention comprises the above-described liquid crystal composition of the invention. The selectively reflective film can be produced by patternwise irradiating the liquid crystal composition with light having suitable wavelengths for achieving purposes described in the section "Change in Helical Structure of Liquid Crystal" or "Fixing of Helical Structure of Liquid Crystal" above.

Through explaining a production process, the selectively reflective film of the invention is described hereinafter in detail.

The selectively reflective film of the invention is produced from the liquid crystal composition of the invention.

In the method for producing the selectively reflective film, the liquid crystal composition is prepared such that the composition displays selective reflection of a first color, then the liquid crystal composition is coated on a substrate, and thereafter the liquid crystal composition is imagewise irradiated with light having a first wavelength to display selective reflection of a second color. Then, the liquid crystal composition is imagewise irradiated with light having a second wavelength, which is different from the first wavelength, to display selective reflection of a third color. Thereafter, the liquid crystal composition is further irradiated with light having a range of wavelengths to which the polymerization initiator is spectrally sensitive to cause photo-polymerization and hardening (hereinafter, this step may be referred to as an "irradiating step"). Further, depending on a suitably selected embodiment for producing a selectively reflective film, the method may further comprise steps of aligning the liquid crystal composition at a surface thereof (aligning step), transferring a liquid crystal layer by adhering and removing a transfer material (transferring step), coating a nematic liquid crystal composition to form a liquid crystal layer (coating step) and the like.

The following is a specific embodiment illustrating a production process, which comprises the irradiating step described above.

Irradiating Step

In the irradiating step, light irradiation is conducted for both patterning and fixing (polymerization and hardening) the liquid crystal compound. That is, light beams having the first and the second wavelengths to which the photoreactive chiral compound is highly photosensitive are imagewise irradiated for patterning, followed by irradiating another light having wavelengths to which the polymerization initiator is highly photosensitive to cause polymerization for fixing the helical structure of the liquid crystal compound, such that desired selective color reflection is displayed.

When the liquid crystal composition is irradiated with light having a first wavelength, the photoreactive chiral compound included therein responds to the wavelength and causes a change in the helical structure of the liquid crystal, and this structural change allows selective reflection of different colors, to thereby form an imagewise pattern. Thus, by irradiating light beams of varied wavelengths for respective desired regions, a plurality of colors can be obtained corresponding to the used wavelengths. For example, by irradiating light through an imagewise formed photomask having different transmissive areas, colored regions selectively reflecting different colors can be formed. Then, by further irradiating light having wavelengths to which the polymerization initiator is photosensitive to effect curing (fixing), a liquid crystal color filter can be produced.

The illuminance (illumination intensity) of the light for patterning and polymerization (curing) is not particularly limited and may be suitably selected depending on the used materials so as to obtain sufficient photosensitivity for patterning and polymerization (curing). As the light source for irradiating the first and the second light, light sources similar to those used for irradiating the liquid crystal composition described above can be used.

More specifically, the selectively reflective color filter may preferably be produced according to a first or a second embodiment described below.

[First Embodiment]

(1) The step of providing the liquid crystal composition in the form of a coating solution on a tentative support to prepare a transfer material containing at least a liquid crystal layer The liquid crystal composition in the form of a coating solution can be prepared by dissolving or dispersing each component in an appropriate solvent. Examples of the solvent include 2-butanone, cyclohexanone, methylene chloride and chloroform.

If foreign matters or the like are present on a material to be transferred, a cushioning layer containing a thermoplastic resin or the like may be disposed between the liquid crystal layer and the tentative support in order to secure adhesiveness at the time of transferring the material. It is also preferable to subject the surface of the cushioning layer to aligning treatment such as rubbing (aligning step).

(2) The step of laminating the transfer material on a light transmissive substrate In addition to the light transmissive substrate, there may be used an image receiving material comprising a substrate and having disposed thereon an image receiving layer. Alternatively, the liquid crystal composition may directly be provided on the substrate by applying coating (a coating step), without using the transfer material. Applying coating may be conducted by employing suitably selected known methods using a bar coater, a spin coater, and the like. In consideration of material loss and cost, the transferring method is preferable.

(3) The step of removing the transfer material from the light transmissive substrate to provide a cholesteric liquid crystal layer on the substrate (a transferring step)

The liquid crystal layer may have a multi-layer construction by further laminating additional layers after the step (4) described below.

(4) The step of imagewise irradiating the cholesteric liquid crystal layer with UV light having the first wavelength through a photomask to form a pixel pattern capable of selective color reflection, and thereafter irradiating UV light having the second wavelength through another photomask having a different pattern from that of the previous photomask to form another pixel pattern which is different from that formed by Light having the first wavelength, and further irradiating UV light to harden the liquid crystal layer (irradiating step).

[Second Embodiment]

(1) The step of forming the liquid crystal layer by directly providing the liquid crystal composition on a support for producing a color filter The liquid crystal layer can be formed by applying coating of the liquid crystal composition, which is prepared in the form of a coating solution similarly to the above-described embodiment, through conventionally known methods using a bar coater, spin coater or the like.

Further, an alignment layer may be disposed, similarly to the first embodiment described above, between the cholesteric liquid crystal layer and the tentative support. The alignment layer may be subjected to aligning treatment such as rubbing at a surface thereof (aligning step).

(2) Irradiating step similar to the Step (4) in the first embodiment

The thickness of the liquid crystal layer (liquid crystal composition in the form of a sheet), which serves as a liquid crystal color filter, is preferably 1.5 to 4 μm.

The invention is further described referring to the drawings. FIGS. 1A to 1I schematically represent an embodiment of the process for producing a liquid crystal color filter of the invention.

First, each of the above-described components is dissolved in a suitable solvent to prepare a cholesteric liquid crystal composition in the form of a coating solution. The components and the solvent are the same as described above.

As shown in FIG. 1A, a support 10 (hereinafter also referred to as a "tentative support") is prepared. On the support 10, a cushioning layer (thermoplastic resin layer) 12 is provided by applying coating of, for example, an acrylic resin, polyester or polyurethane. Further, an alignment layer 14 comprising polyvinyl alcohol or the like is laminated thereon. The alignment layer is subjected to rubbing treatment as shown FIG. 1B. Although the rubbing treatment is not always necessary, this treatment can improve aligning property.

Figure 1C:
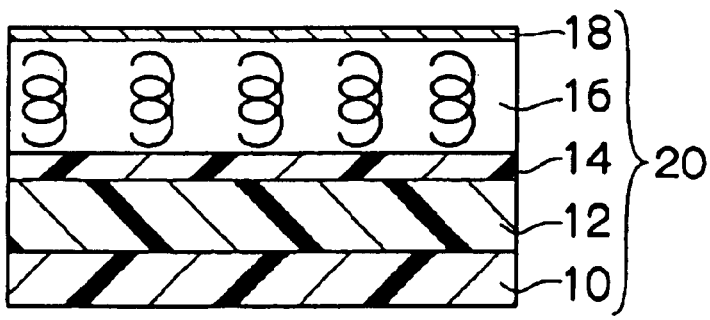

Next, as shown in FIG. 1C, the cholesteric liquid crystal composition in the form of a coating solution is provided on the alignment layer 14 and then dried to form a cholesteric liquid crystal layer 16. Thereafter, a cover film 18 is provided on the liquid crystal layer 16 to prepare a transfer material. The transfer material is hereinafter referred to as a transfer sheet 20. Here, the cholesteric liquid crystal composition is prepared to include two kinds of photoreactive chiral compounds that are photosensitive to light beams having mutually different wavelengths and capable of reflecting light of the green color (G) while transmitting light of the blue color (B) and light of the red color (R).

Figure 1D:
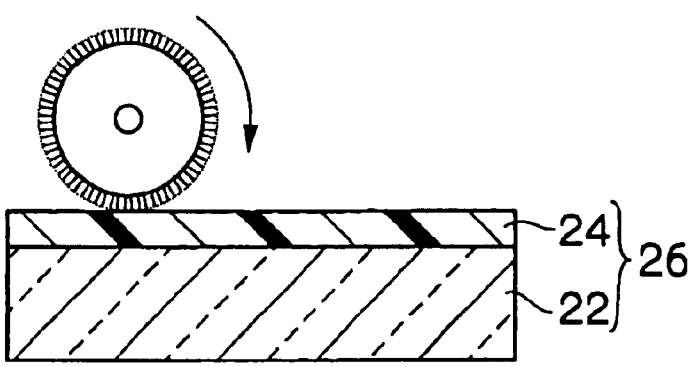

Then, as shown in FIG. 1D, another support 22 is prepared. On the support 22, an alignment layer 24 is formed in the same manner as described above, and rubbing treatment is performed at a surface of the alignment layer 24. The resultant support is hereinafter referred to as a color filter substrate 26.

Figure 1E:
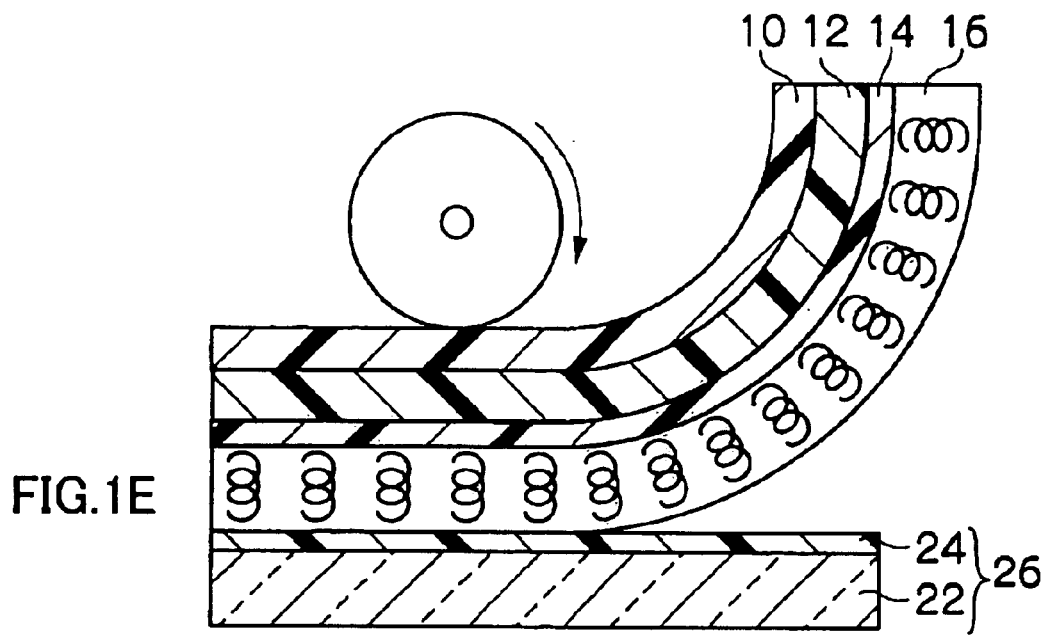
Figure 1F:
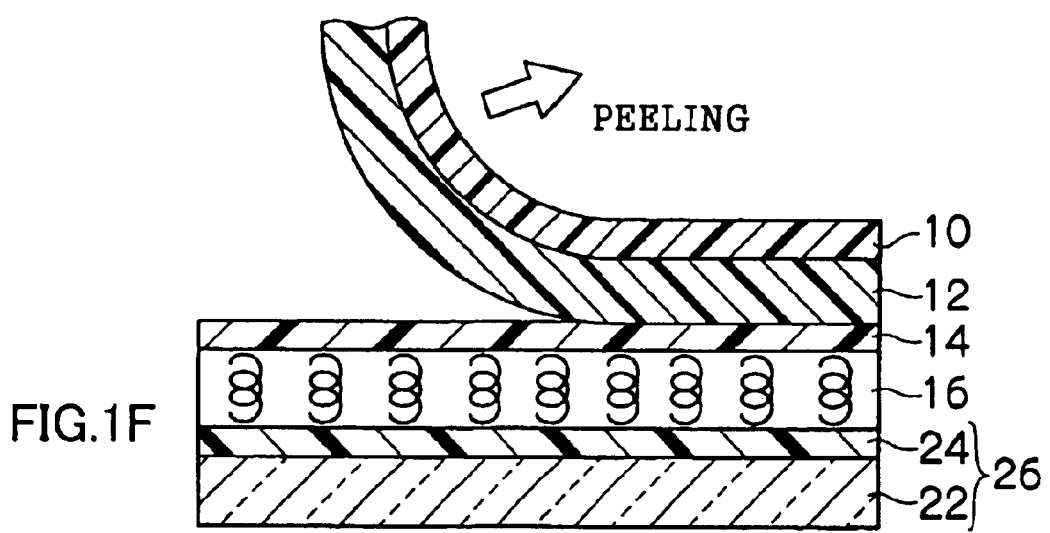

Subsequently, the cover film 18 is peeled off from the transfer sheet 20. Then the transfer sheet 20 is superposed on the color filter substrate 26 so that the surface of the cholesteric liquid crystal layer 16 of the transfer sheet 20 is brought into contact with the surface of the alignment layer 24 of the color filter substrate 26 as shown in FIG. 1E, followed by lamination through a roll rotating in a direction of the arrow in the drawing. Thereafter, as shown in FIG. 1F, the tentative support and the cushioning layer are removed from the alignment layer 14 of the transfer sheet 20. Thus, the cholesteric liquid crystal layer 14 is transferred, together with the alignment layer, onto the color filter substrate. In this case, the cushioning layer 12 may not necessarily be removed together with the tentative support 10.

Figure 1G:
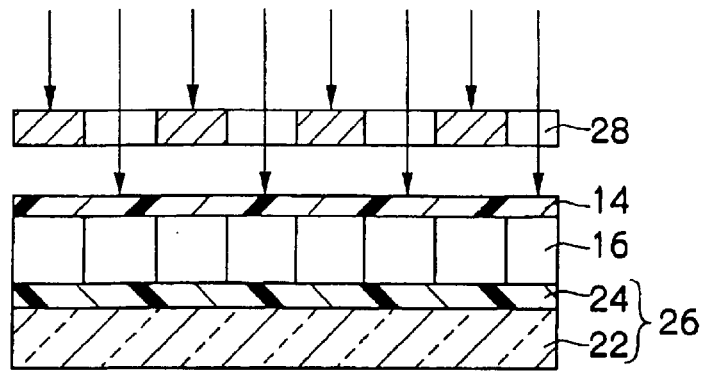

After the transfer, as shown in FIG. 1G, a photomask 28 is arranged on the alignment layer 14 and the cholesteric liquid crystal layer 16 is patternwise irradiated with light having the first wavelength through the photomask 28. Then, another photomask (not shown) having a pattern different from that of the photomask 28 is arranged and another patternwise irradiation is conducted using light having the second wavelength. The cholesteric liquid crystal layer 16 comprises a photoreactive chiral compound to undergo isomerization when irradiated with light having the first wavelength and another photoreactive chiral compound to undergo isomerization when irradiated with light having the second wavelength. Thus, there are formed regions, corresponding to the pattern of the photomask, consisting of a region reflecting green light (G) while transmitting blue light (B) and red light (R), a region reflecting blue light (B) while transmitting green light (G) and red light (R), and a region reflecting red light (R) while transmitting green light (G) and blue light (B).

Figure 1H:
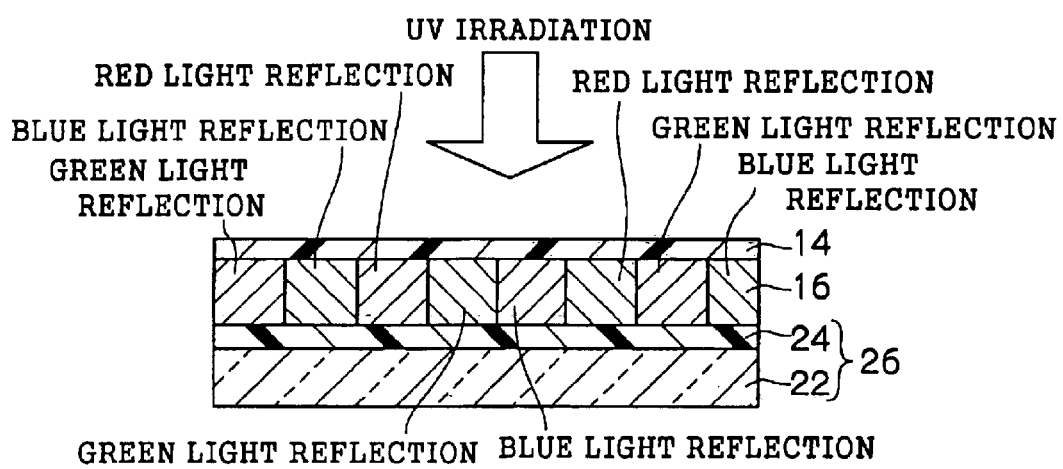

Then, as shown in FIG. 1H, the formed pattern is fixed by further irradiating the cholesteric liquid crystal layer 16 with UV light at an illumination intensity which is different from that used in the above step 1G. Thereafter, unnecessary portions (for example, residual portions such as the cushioning layer and the intermediate layer, and unexposed portions) on the cholesteric liquid crystal layer 16 are removed using 2-butanone, chloroform or the like solvent, to finally form a cholesteric liquid crystal layer having respective regions to display each of the BGR light reflection, as shown in FIG. 1I.

Figure 1I:
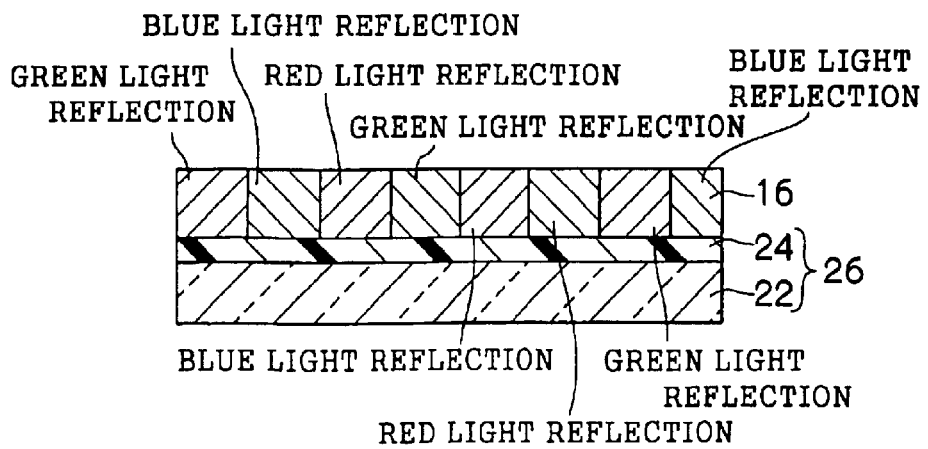
Figure 2:
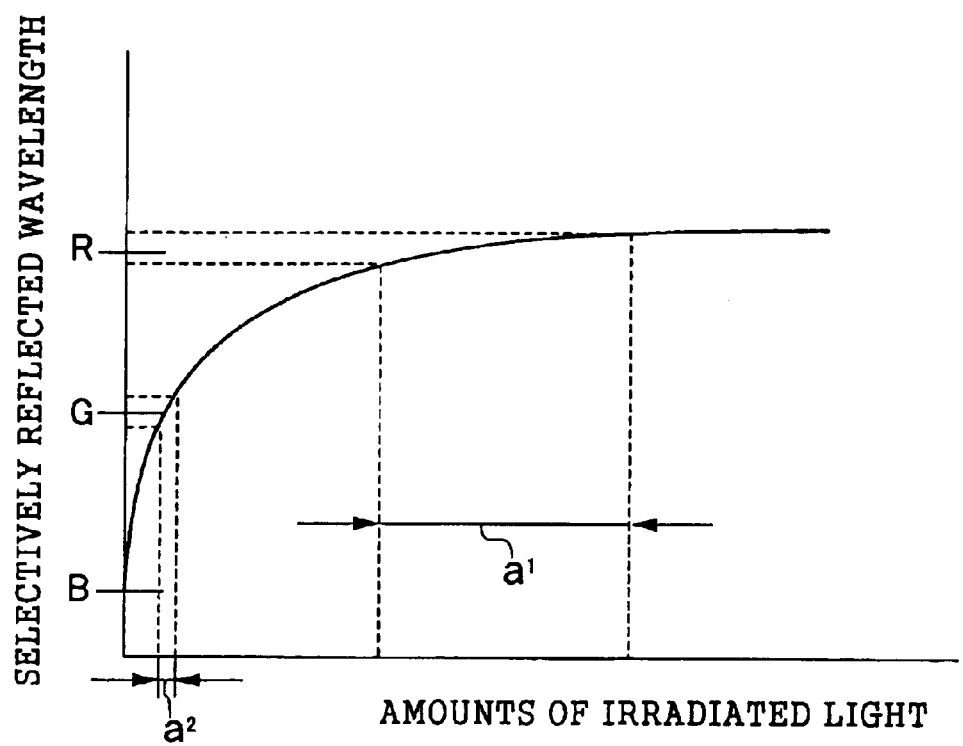
FIG. 2 is a graph showing a relationship between amounts of light irradiated on a liquid crystal composition and a selectively reflected wavelength.

While the schematic diagrams shown in FIGS. 1A to 1I represent one typical process for producing a color filter according to a laminating method, another production process according to an applying method may be used in which a liquid crystal layer is directly provided by applying coating on a color filter substrate to form a color filter. In the latter case, a cholesteric liquid crystal layer is formed by applying coating on the alignment layer 24 of the color filter substrate 26 shown in FIG. 1D and dried, after which the steps shown in FIGS. 1G to 1I are successively performed.

The steps, and the materials for the transfer material, the support and the like are detailed in Japanese Patent Application Nos. 11-342896 and 11-343665, which have previously been filed by the present inventors.

EXAMPLES

Example 1

1. Preparation of Substrate

A coating solution for a polyimide alignment layer (LX-1400 manufactured by Hitachi Chemistry Dupont Co., Ltd.) was applied on a glass substrate using a spin coater, followed by drying in an oven at 100° C. for 5 minutes and subsequent heating in the oven at 250° C. for 1 hour for baking, to thereby form an alignment layer. Then an aligning treatment was conducted at the surface of this layer by rubbing to prepare the glass substrate having formed thereon an alignment layer.

2. Formation of Photosensitive Layer

A coating solution for a photosensitive liquid crystal layer prepared according to the following formulation was applied using a spin coater on the alignment layer disposed on the glass substrate produced as above, followed by drying in the oven at 100° C. for 2 minutes to form a photosensitive liquid crystal layer. The thickness of the layer was measured using a confocal microscope and found to be 2.3 μm.

[Formulation of the coating solution for the photosensitive liquid crystal layer (1)]
chiral compound
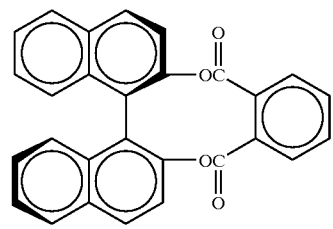
1.1 parts by mass
photoreactive chiral compound (E form)
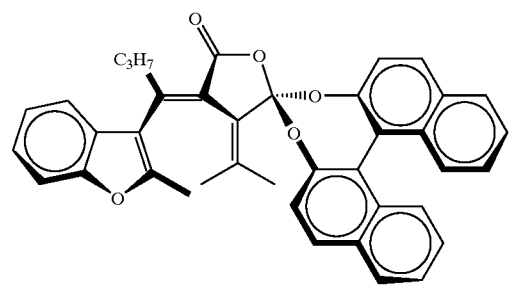
1.8 parts by mass
photoreactive chiral compound (C form)
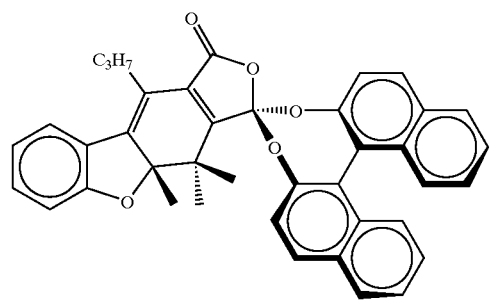
1.8 parts by mass
liquid crystal compound
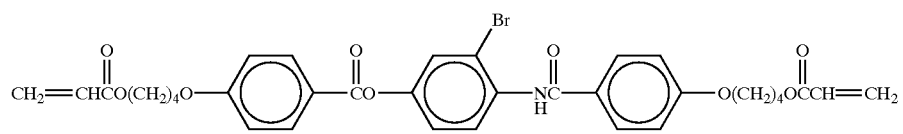
92.4 parts by mass
air interface alignment agent
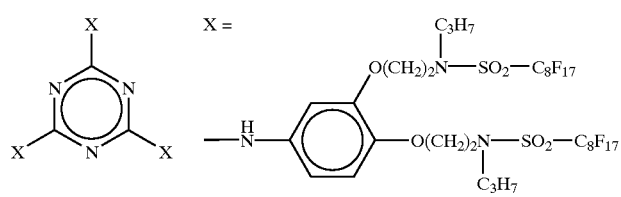
0.2 part by mass
polymerization initiator

[Formulation of the coating solution for the photosensitive liquid crystal layer (1)]

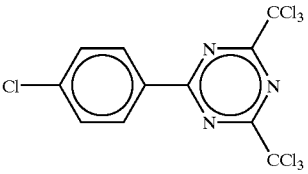

2 parts by mass polymerization inhibitor — Hydroquinone monomethyl ether 0.5 part by mass solvent Cyclohexanone — 350 parts by mass 3. Patterning of Color Filter a) Patterning of R color: the photosensitive liquid crystal layer was irradiated with light through a photomask having 80 μm-wide openings and an interference filter having a central wavelength of transmission at 405 nm, at the positions corresponding to R color, using a super-high pressure mercury lamp at illumination intensity of 20 mW/cm² at room temperature for 10 seconds.

b) Patterning of B color: the photosensitive liquid crystal layer was irradiated with light through a photomask having 80 μm-wide openings and an interference filter having a central wavelength of transmission at 313 nm, at the positions corresponding to B color, using a super-high pressure mercury lamp at illumination intensity of 10 mW/cm² at room temperature for 10 seconds.

4. Fixing of Color Filter by Polymerization

Then, the resultant glass substrate was maintained on a hot plate at a temperature of 110° C. for 1 minute to align the photosensitive liquid crystal layer. Subsequently, under nitrogen atmosphere and at 60° C., light was irradiated using a super-high pressure mercury lamp at illumination intensity of 100 mW/cm² through an interference filter having a central wavelength of transmission at 313 nm for 5 seconds to thereby polymerize and harden the photosensitive liquid crystal layer. Then, heat application was further conducted at 250° for 15 minutes to accelerate hardening of the resultant layer.

The thus produced color filter was measured for a central wavelength of transmission at each region displaying selective reflection of one of the colors B, G or R, which central wavelengths were respectively 450 nm, 540 nm and 650 nm. A variation in central selective reflection at each of the color regions was within ±1.5 nm and thus revealed to be highly uniform.

Example 2

1. Preparation of Substrate

A glass substrate provided with an alignment layer was prepared in the same manner as in Example 1.

2. Formation of Photosensitive Layer

A coating solution for a photosensitive liquid crystal layer prepared according to the following formulation was applied on the alignment layer of the glass substrate, formed as above, using a spin coater followed by drying in an oven at 100° C. for 2 minutes, to form a photosensitive liquid crystal layer. The thickness of the layer measured using a confocal microscope was 2.4 μm.

[Formulation of the coating solution for the photosensitive liquid crystal layer (2)]

chiral compound

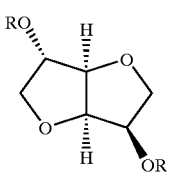

7.8 parts by mass photoreactive chiral compound

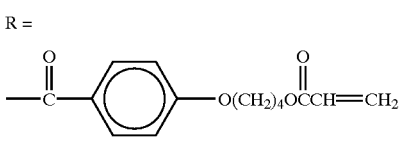

3.0 parts by mass photoreactive chiral compound

-continued

[Formulation of the coating solution for the photosensitive liquid crystal layer (2)]

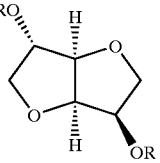

liquid crystal compound — 2.1 parts by mass

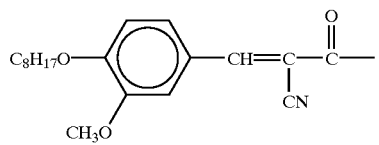

Air interface alignment agent — 84.4 parts by mass

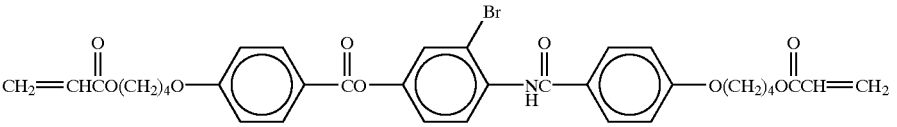

polylmerizaton initiator — 0.2 part by mass

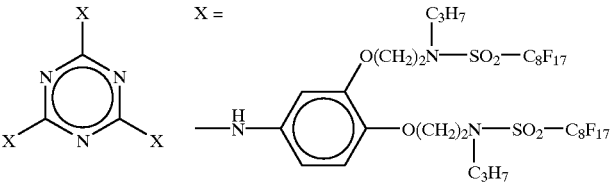

— 2 parts by mass polymerization inhibitor — Hydroquinone monomethyl ether 0.5 part by mass solvent Cyclohexanone — 350 parts by mass 3. Patterning of Color Filter a) Patterning of R color: the photosensitive liquid crystal layer was irradiated with light through a photomask having 80 μm-wide openings and an interference filter having a central wavelength of transmission at 365 nm, at the positions corresponding to R color, using a super-high pressure mercury lamp at illumination intensity of 20 mW/cm² at room temperature for 10 seconds.

b) Patterning of B color: the photosensitive liquid crystal layer was irradiated with light through a photomask having 80 μm-wide openings and an interference filter having a central wavelength of transmission at 313 nm, at the positions corresponding to B color, using a super-high pressure mercury lamp at illumination intensity of 10 mW/cm² at room temperature for 10 seconds.

4. Fixing of Color Filter by Polymerization

Then, the resultant glass substrate was maintained on a hot plate at a temperature of 110° C. for 1 minute to align the photosensitive liquid crystal layer. Subsequently, under nitrogen atmosphere and at 60° C., light was irradiated using a super-high pressure mercury lamp at illumination intensity of 100 mW/cm² through an interference filter having a central wavelength of transmission at 313 nm for 5 seconds to thereby polymerize and harden the photosensitive liquid crystal layer. Then, heat application was further conducted at 250° C. for 15 minutes to promote hardening of the resultant layer.

The thus produced color filter was measured for a central wavelength of transmission at each region displaying selective reflection of one of the colors B, G or R, which central wavelengths were respectively 455 nm, 535 nm and 650 nm. A variation in central selective reflection at each of the color regions was within ±1.5 nm and thus revealed to be highly uniform.

Example 3

1. Preparation of Substrate

A glass substrate provided with an alignment layer was prepared in the same manner as in Example 1.

2. Formation of Photosensitive Layer

A coating solution for a photosensitive liquid crystal layer prepared according to the following formulation was applied on the alignment layer of the glass substrate, formed as above, using a spin coater followed by drying in an oven at 100° C. for 2 minutes, to form a photosensitive liquid crystal layer. The thickness of the layer measured using a confocal microscope was 2.4 μm.

[Formulation of the coating solution for the photosensitive liquid crystal layer (3)]

chiral compound

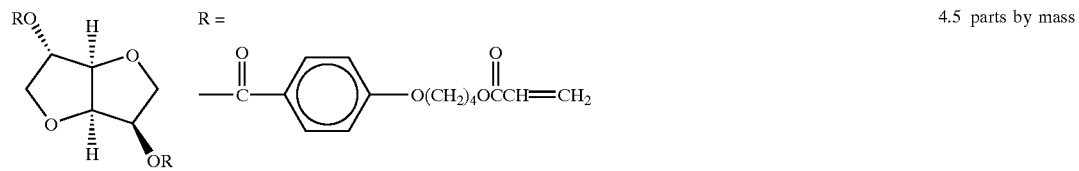

4.5 parts by mass photoreactive chiral compound

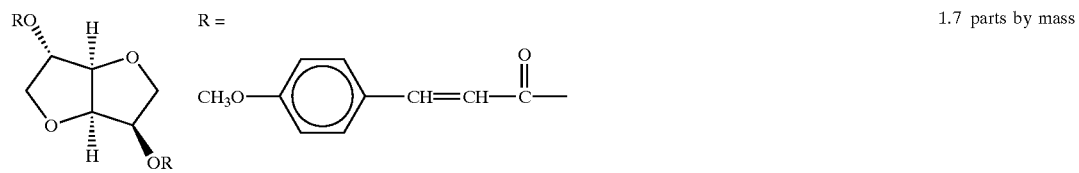

1.7 parts by mass photoreactive chiral compound

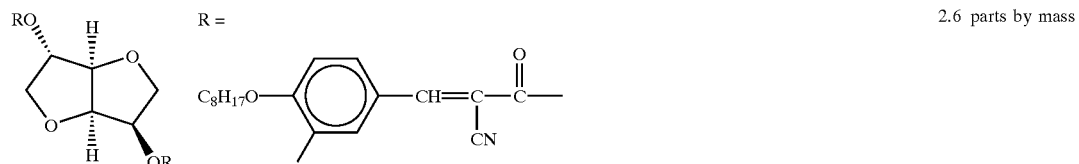

2.6 parts by mass liquid crystal compound

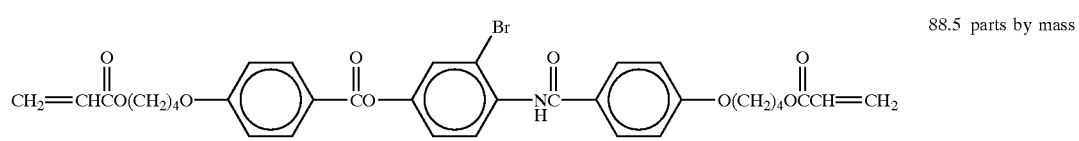

88.5 parts by mass air interface alignment agent

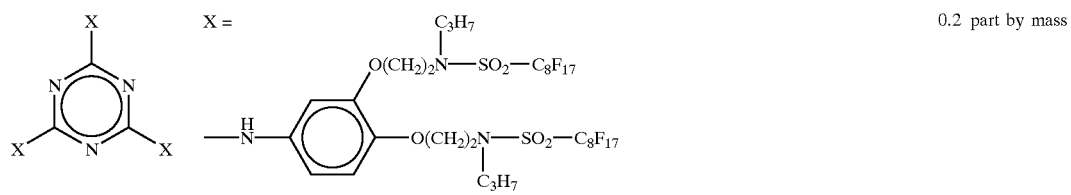

0.2 part by mass polymerization initiator

2 parts by mass polymerization inhibitor

Hydroquinone monomethyl ether 0.5 part by mass solvent Cyclohexanone 350 parts by mass 3. Patterning of Color Filter a) Patterning of R color: the photosensitive liquid crystal layer was irradiated with light through a photomask having 80 μm-wide openings and an interference filter having a central wavelength of transmission at 365 nm, at the positions corresponding to G color and R color, using a super-high pressure mercury lamp at illumination intensity of 20 mW/cm² at room temperature for 15 seconds.

b) Patterning of R color: the photosensitive liquid crystal layer was irradiated with light through a photomask having 80 μm-wide openings and an interference filter having a central wavelength of transmission at 313 nm, at the positions corresponding to R color, using a super-high pressure mercury lamp at illumination intensity of 10 mW/cm² at room temperature for 10 seconds.

4. Fixing of Color Filter by Polymerization

Then, the resultant glass substrate was maintained on a hot plate at a temperature of 110° C. for 1 minute to align the photosensitive liquid crystal layer. Subsequently, under nitrogen atmosphere and at 60° C., light was irradiated using a super-high pressure mercury lamp at illumination intensity of 100 mW/cm² through an interference filter having a central wavelength of transmission at 313 nm for 5 seconds to thereby polymerize and harden the photosensitive liquid crystal layer. Then, heat application was further conducted at 250° C. for 15 minutes to facilitate hardening of the resultant layer.

The thus produced color filter was measured for a central wavelength of transmission at each region displaying selective reflection of one of the colors B, G or R, which central wavelengths were respectively 453 nm, 535 nm and 655 nm. A variation in central selective reflection at each of the color regions was within +1.5 nm and thus revealed to be highly uniform.

Example 4

1. Preparation of Substrate

A glass substrate provided with an alignment layer was prepared in the same manner as in Example 1.

2. Formation of Photosensitive Layer

A coating solution for a photosensitive liquid crystal layer prepared according to the following formulation was applied on the alignment layer of the glass substrate, formed as above, using a spin coater followed by drying in an oven at 100° C. for 2 minutes, to form a photosensitive liquid crystal layer. The thickness of the layer measured using a confocal microscope was 2.3 μm.

[Formulation of the coating solution for the photosensitive liquid crystal layer (4)]

chiral compound

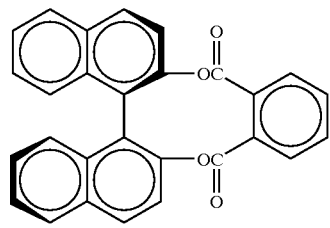

4.4 parts by mass photoreactive chiral compound

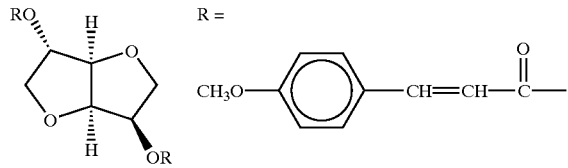

3.9 parts by mass photoreactive chiral compound

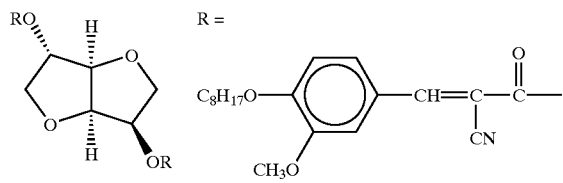

2.1 parts by mass liquid crystal compound

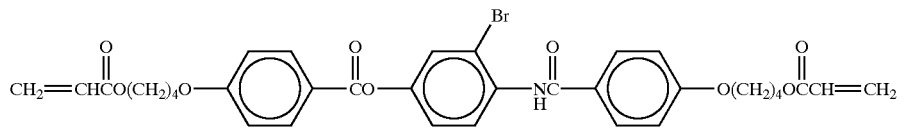

89.6 parts by mass air interface orienting agent

| [Formulation of the coating solution for the photosensitive liquid crystal layer (4)] | |
|---|---|
| polymerization initiator: triazine with X groups where X = -NH-C6H3(O(CH2)2N(C3H7)SO2C8F17)2 | 0.2 part by mass |
| polymerization inhibitor: Cl-C6H4-pyrimidine(CCl3)2 | 2 parts by mass |
| | Hydroquinone monomethyl ether 0.5 part by mass |
| solvent Cyclohexanone | 350 parts by mass |

3. Patterning of Color Filter a) Patterning of G color: the photosensitive liquid crystal layer was irradiated with light through a photomask having 80 μm-wide openings and an interference filter having a central wavelength of transmission at 365 nm, at the positions corresponding to G color, using a super-high pressure mercury lamp at illumination intensity of 20 mW/cm² at room temperature for 15 seconds.

b) Patterning of B color: the photosensitive liquid crystal layer was irradiated with light through a photomask having 80 μm-wide openings and an interference filter having a central wavelength of transmission at 313 nm, at the positions corresponding to B color, using a super-high pressure mercury lamp at illumination intensity of 8 mW/cm² at room temperature for 20 seconds.

4. Fixing of Color Filter by Polymerization

Then, the resultant glass substrate was maintained on a hot plate at a temperature of 110° C. for 1 minute to align the photosensitive liquid crystal layer. Subsequently, under nitrogen atmosphere and at 60° C., light was irradiated using a super-high pressure mercury lamp at illumination intensity of 100 mW/cm² through an interference filter having a central wavelength of transmission at 313 nm for 5 seconds to thereby polymerize and harden the photosensitive liquid crystal layer. Then, heat application was further conducted at 250° C. for 15 minutes to facilitate hardening of the resulting layer.

The thus produced color filter was measured for a central wavelength of transmission at each region displaying selective reflection of one of the colors B, G or R, which central wavelengths were respectively 448 nm, 543 nm and 650 nm. A variation in central selective reflection at each of the color regions was within ±1.5 nm and thus revealed to be highly uniform.

What is claimed is:

1. A liquid crystal composition comprising:

a liquid crystal compound containing at least one polymerizable group;

a photoreactive chiral compound that undergoes reversible isomerization when irradiated with either of two light beams having mutually different wavelengths and exhibits an HTP after isomerization by each light beam, which HTPs are mutually different; and a polymerization initiator, further comprising a surfactant exerting an excluded volume effect distributed over an air interface side.

2. A liquid crystal composition comprising:

a liquid crystal compound containing at least one polymerizable group;

two or more kinds of photoreactive chiral compounds that undergo isomerization when respectively irradiated with light beams having mutually different wavelengths and exhibit mutually different HTPs alter isomerization; and a polymerization initiator, further comprising a surfactant exerting an excluded volume effect distributed over an air interface side.

3. A liquid crystal composition comprising:

a liquid crystal compound containing at least one polymerizable group;

two or more kinds of photoreactive chiral compounds that undergo isomerization when respectively irradiated with light beams having mutually different wavelengths and exhibit mutually different HTPs after isomerization; and a polymerization initiator, further comprising a non-photoreactive chiral compound, further comprising a surfactant exerting an excluded volume effect distributed over an air interface side.

4. A selectively reflective film produced by polymerizing and curing a liquid crystal composition comprising a liquid crystal compound containing at least one polymerizable group; two or more kinds of photoreactive chiral compounds that undergo isomerization when respectively irradiated with light beams having mutually different wavelengths and exhibit mutually different HTPs after isomerization; and a polymerization initiator, wherein the liquid crystal composition further comprises a surfactant exerting an excluded volume effect distributed over an air interface side.

5. A selectively reflective film produced by polymerizing and curing a liquid crystal composition comprising a liquid crystal compound containing at least one polymerizable group; a photoreactive chiral compound that undergoes reversible isomerization when irradiated with either of two light beams having mutually different wavelengths and exhibits an HTP after isomerization by each light beam, which HTPs are mutually different; and a polymerization initiator, wherein the liquid crystal composition further comprises a surfactant exerting an excluded volume effect distributed over an air interface side.

6. A method for producing a selectively reflective film using a liquid crystal composition comprising a liquid crystal compound containing at least one polymerizable group; two or more kinds of photoreactive chiral compounds that undergo isomerization when respectively irradiated with light beams having mutually different wavelengths and exhibit mutually different HTPs after isomerization; and a polymerization initiator, the method comprising the steps of:

preparing the liquid crystal composition, which is capable of displaying selective reflection of a first color;

coating the liquid crystal composition on a surface of a substrate;

imagewise irradiating light having a first wavelength to which one of the photoreactive chiral compounds is photosensitive to undergo isomerization, such that selective reflection of a second color is displayed;

imagewise irradiating light having a second wavelength, which is different from the first wavelength and to which another of the photoreactive chiral compounds is photosensitive to undergo isomerization, such that selective reflection of a third color is displayed; and polymerizing the liquid crystal compound, wherein the liquid crystal composition further comprises a surfactant exerting an excluded volume effect distributed over an air interface side.

7. A method for producing a selectively reflective film using a liquid crystal composition comprising a liquid crystal compound containing at least one polymerizable group; a photoreactive chiral compound that undergoes reversible isomerization when irradiated with either of two light beams having mutually different wavelengths and exhibits an HTP after isomerization by each light beam, which HTPs are mutually different; and a polymerization initiator, the method comprising the steps of:

preparing the liquid crystal composition, which is capable of displaying selective reflection of a first color;

coating the liquid crystal composition on a surface of a substrate;

imagewise irradiating light having a first wavelength to which the photoreactive chiral compound is photosensitive to undergo isomerization, such that selective reflection of a second color is displayed;

imagewise irradiating light having a second wavelength, which is different from the first wavelength and to which the photoreactive chiral compound is photosensitive to undergo isomerization, such that selective reflection of a third color is displayed; and polymerizing the liquid crystal compound, wherein the liquid crystal composition further comprises a surfactant exerting an excluded volume effect distributed over an air interface side.

8. The method for producing a selectively reflective film according to claim 7, wherein the surfactant is a nonionic surfactant.

* * * * *